(12) United States Patent
Hiroi et al.

(10) Patent No.: US 11,086,969 B2
(45) Date of Patent: Aug. 10, 2021

(54) INFORMATION PROCESSING DEVICE AND INFORMATION PROCESSING METHOD

(71) Applicant: SONY CORPORATION, Tokyo (JP)

(72) Inventors: Toshiyuki Hiroi, Tokyo (JP); Akira Nakamura, Kanagawa (JP); Makiko Yamamoto, Tokyo (JP); Ryoji Ikegaya, Tokyo (JP)

(73) Assignee: SONY CORPORATiON, Tokyo (JP)

( * ) Notice: Subject to any disclaimer, the term of this patent is extended or adjusted under 35 U.S.C. 154(b) by 261 days.

(21) Appl. No.: 16/463,193

(22) PCT Filed: Jun. 29, 2018

(86) PCT No.: PCT/JP2018/024923
§ 371 (c)(1),
(2) Date: May 22, 2019

(87) PCT Pub. No.: WO2019/064774
PCT Pub. Date: Apr. 4, 2019

(65) Prior Publication Data
US 2020/0073912 A1 Mar. 5, 2020

(30) Foreign Application Priority Data
Sep. 29, 2017 (JP) .............................. JP2017-189889

(51) Int. Cl.
*G06F 17/16* (2006.01)
*G06F 7/483* (2006.01)
(Continued)

(52) U.S. Cl.
CPC .............. *G06F 17/16* (2013.01); *G06F 7/483* (2013.01); *G06N 3/0454* (2013.01); *G06N 3/063* (2013.01)

(58) Field of Classification Search
CPC .......... G06F 17/16; G06F 7/483; G06N 3/063; G06N 3/0454; G06N 3/08
(Continued)

(56) References Cited

U.S. PATENT DOCUMENTS

| | | | | |
|---|---|---|---|---|
| 4,718,032 A | * | 1/1988 | Irukulla | ................... G06F 7/535 |
| | | | | 708/654 |
| 5,719,955 A | | 2/1998 | Mita | |
| 2021/0048982 A1 | * | 2/2021 | Klein | ..................... G06F 7/4876 |

FOREIGN PATENT DOCUMENTS

JP    H04-051384 A    2/1992

OTHER PUBLICATIONS

Jan. 28, 2020, European Search Report issued for related EP Application No. 18860078.7.
(Continued)

*Primary Examiner* — Tan V Mai
(74) *Attorney, Agent, or Firm* — Paratus Law Group, PLLC

(57) ABSTRACT

There is provided an information processing device to reduce a processing load associated with inner product operations while also guaranteeing the quantization granularity of weight coefficients, the information processing device including: a multiply-accumulate operation circuit configured to execute a multiply-accumulate operation on the basis of multiple input values and multiple weight coefficients that are quantized by an exponential representation and that correspond to each of the input values. Exponents of the quantized weight coefficients are expressed by fractions taking a predetermined divisor as a denominator, and the multiply-accumulate operation circuit performs the multiply-accumulate operation using different addition multipliers on the basis of a remainder determined from the divisor.

13 Claims, 27 Drawing Sheets

(51) Int. Cl.
*G06N 3/04* (2006.01)
*G06N 3/063* (2006.01)

(58) Field of Classification Search
USPC .......................................................... 708/490
See application file for complete search history.

(56) References Cited

OTHER PUBLICATIONS

Zhou et al., Balanced Quantization: An Effective and Efficient Approach to Quantized Neural Networks, arXiv, Jun. 22, 2017, pp. 1-34, arXiv.1706.07145v1.

Chen et al., FxpNet: Training a Deep Convolutional Neural Network in Fixed-Point Representation, 2017 International Joint Conference on Neural Networks (IJCNN), May 14-19, 2017, pp. 2494-2501, IEEE, Anchorage, AK, USA.

Feb. 26, 2019, Japanese Decision to Grant a Patent issued for related JP application No. 2019-504151.

Miyashita et al., Convolutional Neural Networks using Logarithmic Data Representation, Mar. 17, 2016, pp. 1-10, retrieved from: https://arxiv.org/abs/1603.01025v2.

Hubara et al., Quantized Neural Networks: Training Neural Networks with Low Precision Weights and Activations, Sep. 22, 2016, pp. 1-29, retrieved from: https://arxiv.org/abs/1609.07061v1.

Tang et al., Multilayer Feedforward Neural Networks with Single Powers-of-Two Weights, IEEE Transactions on Signal Processing, Aug. 1993, pp. 2724-2727, vol. 41, Issue: 8, retrieved from: https://ieeexplore.ieee.org/abstract/document/229903/.

Feb. 26, 2019, Japanese Office Action issued for related JP application No. 2019-504151.

Tang et al., Multilayer Feedforward Neural Networks with Single Powers-of-Two Weights, IEEE Transactions on Signal Processing, Aug. 1993, pp. 2724-2727, vol. 41, Issue: 8, IEEE.

Matthieu Courbariaux et al., BinaryConnect: Training Deep Neural Networks with binary weights during propagations, Nov. 12, 2015, pp. 1-9, Retrieved from: https://arxiv.org/abs/1511.00363v2.

\* cited by examiner

| | | |
|---|---|---|
| pointer TO Cell(j=1) | + | 1 |
| Offset = 1 | + | 0 |
| Offset = 2 | − | 0 |
| Offset = 1 | + | 0 |
| ⋮ | ⋮ | ⋮ |
| pointer TO Cell(j=N) | − | 1 |

WT

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2018/024923 (filed on Jun. 29, 2018) under 35 U.S.C. § 371, which claims priority to Japanese Patent Application No. 2017-189889 (filed on Sep. 29, 2017), which are all hereby incorporated by reference in their entirety.

TECHNICAL FIELD

The present disclosure relates to an information processing device and an information processing method.

BACKGROUND ART

Recently, mathematical models called neural networks that resemble the workings of neural systems are receiving attention. Also, various techniques for reducing the processing load of computations in a neural network are being proposed. For example, Non-Patent Literature 1 describes a technique of reducing the processing load by making weight coefficients binary. Also, Non-Patent Literature 2 describes a technique of converting multiplication to addition by converting an input signal to a logarithmic domain.

CITATION LIST

Non-Patent Literature

Non-Patent Literature 1: Matthieu Courbariaux et al., "BinaryConnect: Traininig Deep Neural Networks with binary weights during propagations", [online], Nov. 11, 2015, arXiv, [retrieved Mar. 22, 2017], Internet <URL: https://arxiv.org/pdf/1511.00363.pdf>

Non-Patent Literature 2: Daisuke Miyashita et al., "Convolutional Neural Networks using Logarithmic Data Representation", [online], Mar. 3, 2016, arXiv, [retrieved Mar. 22, 2017], Internet <URL: https://arxiv.org/pdf/1603.01025.pdf>

DISCLOSURE OF INVENTION

Technical Problem

However, with the technique described in Non-Patent Literature 1, since binarization using +1 or −1 is performed, the quantization granularity is expected to become rougher as the dimensionality of the weight coefficients increases. Also, the technique described in Non-Patent Literature 2, although having a predetermined effect in the avoidance of multiplication, is anticipated to have room for further improvement in the reduction of the processing load.

Accordingly, the present disclosure proposes a novel and improved information processing device and information processing method capable of further reducing the processing load associated with inner product operations while also guaranteeing the quantization granularity of weight coefficients.

Solution to Problem

According to the present disclosure, there is provided an information processing device including: a multiply-accumulate operation circuit configured to execute a multiply-accumulate operation on the basis of multiple input values and multiple weight coefficients that are quantized by an exponential representation and that correspond to each of the input values. Exponents of the quantized weight coefficients are expressed by fractions taking a predetermined divisor as a denominator, and the multiply-accumulate operation circuit performs the multiply-accumulate operation using different addition multipliers on the basis of a remainder determined from the divisor.

Moreover, according to the present disclosure, there is provided an information processing method, executed by a processor, including: executing a multiply-accumulate operation on the basis of multiple input values and multiple weight coefficients that are quantized by an exponential representation and that correspond to each of the input values. Exponents of the quantized weight coefficients are expressed by fractions taking a predetermined divisor as a denominator, and the executing of the multiply-accumulate operation performs the multiply-accumulate operation using different addition multipliers on the basis of a remainder determined from the divisor.

Advantageous Effects of Invention

According to the present disclosure as described above, it becomes possible to further reduce the processing load associated with inner product operations while also guaranteeing the quantization granularity of weight coefficients.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
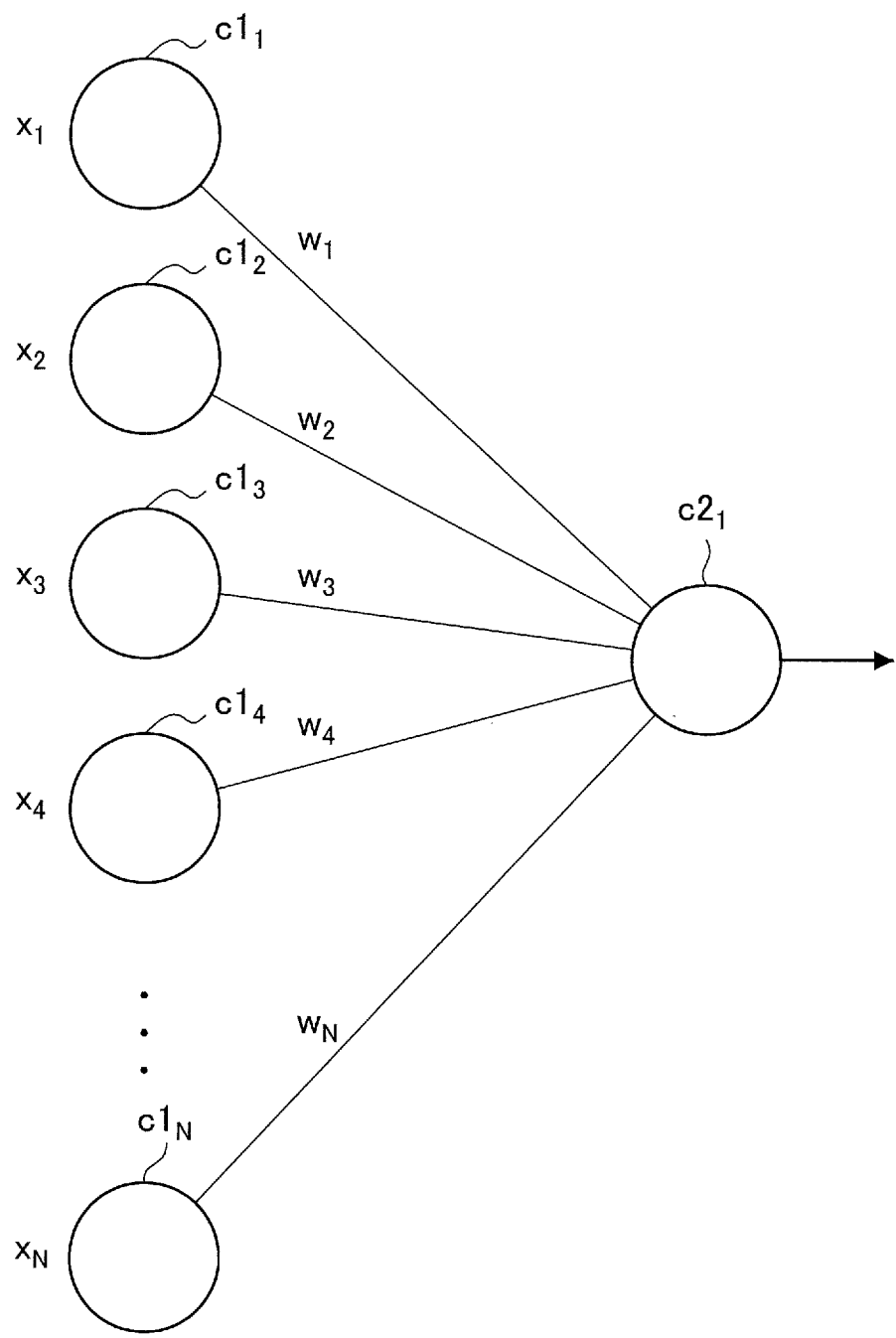
FIG. 1 is a conceptual diagram for explaining an overview of basic computations in a neural network according to a related technology of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Embodiment
1.1. Background
1.2, Exemplary functional configuration of information processing device 10
1.3. Weight vector quantization
1.4. Exemplary configuration of multiply-accumulate operation circuit
1.5. Quantization during learning
1.6. Effects
2. Second embodiment
2.1. Overview
2.2 Quantization of weight vectors
2.3. Quantization of both weight vectors and input vectors
2.4. Effects
2.5. Example of application to communication technology
3. Exemplary hardware configuration
4. Conclusion

1. EMBODIMENT

<<1.1. Background>>

Recently, learning techniques using neural networks, such as deep learning, are being researched widely. Although learning techniques using neural networks are highly accurate, because of the large processing load associated with computation, there is demand for computational methods that reduce the processing load effectively.

For this reason, in recent years, computational methods that aim to reduce the amount of computation and the amount of information, such as binary weight networks and XNMOR nets, for example, have also been proposed.

Herein, an overview of basic computations in a typical neural network will be described. FIG. 1 is a conceptual diagram for explaining an overview of basic computations in a neural network. FIG. 1 illustrates two layers forming the neural network, and cells $c1_1$ to $c1_N$ and a cell $c2_1$ belonging to each of the two layers.

At this point, the input signal (hereinafter also designated the input vector) input into the cell $C2_1$ is decided on the basis of the input vector and weight coefficients (hereinafter also designated the weight vector) associated with the cells $c1_1$ to $c1_N$ belonging to the lower layer. More specifically, the input vector input into the cell $c2_1$ becomes a value obtained by adding a bias b to the result of an inner product operation of the input vector and the weight vector associated with the cells $c1_1$ to $c1_N$, and additionally processing by an activation function h.

In other words, in the case of taking $x=(x_1, x_2, x_3, \ldots, x_N)$ and $w=(w_1, w_2, w_3, \ldots, w_N)$ to be each of the input vector and the weight vector associated with the cells $c1_1$ to $c1_N$, an input vector z input into the cell $c2_1$ is defined by the following Formula (1).

[Math. 1]

$$z = h(\Sigma x_i w_i + b) \qquad (1)$$

Figure 2:
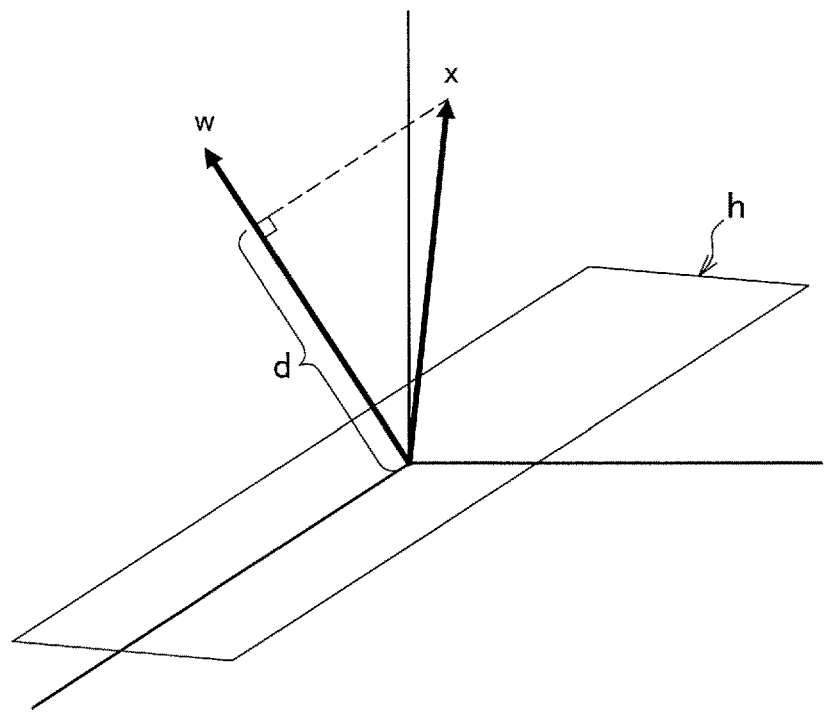
FIG. 2 is an overview diagram for explaining an inner product operation of an input vector and a weight vector according to a related technology of the present disclosure.

At this point, assuming a hyperplane h whose normal is the weight vector w, as illustrated in FIG. 2, the inner product of the input vector x and the weight vector w expressed in N dimensions can be expressed as the value obtained by multiplying $\|w\|$ by a projection distance d of projecting the input vector x onto the weight vector w based on the hyperplane h. Herein, the above $\|w\|$ is the norm of the vector w. FIG. 2 is an overview diagram for explaining the inner product operation of the input vector x and the weight vector w.

Figure 3:
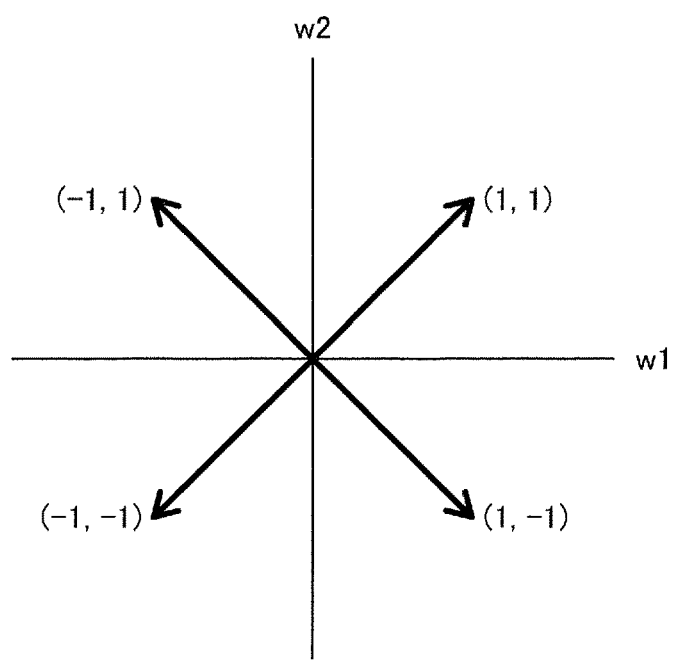
FIG. 3 is a diagram for explaining a binary-quantized weight vector in a two-dimensional space according to a related technology of the present disclosure.

At this point, in the case in which the input vector x and the weight vector w are two-dimensional, if the weight vector w is quantized into a binary value of +1 or −1 like in Non-Patent Literature 1, the weight vector w can be represented as in FIG. 3. FIG. 3 is a diagram for explaining the binary-quantized weight vector w in a two-dimensional space. At this point, the granularity of the weight vector w can be expressed by a rotational angle θ in the plane, and as illustrated in FIG. 3, the granularity becomes 90 degrees.

Figure 4:
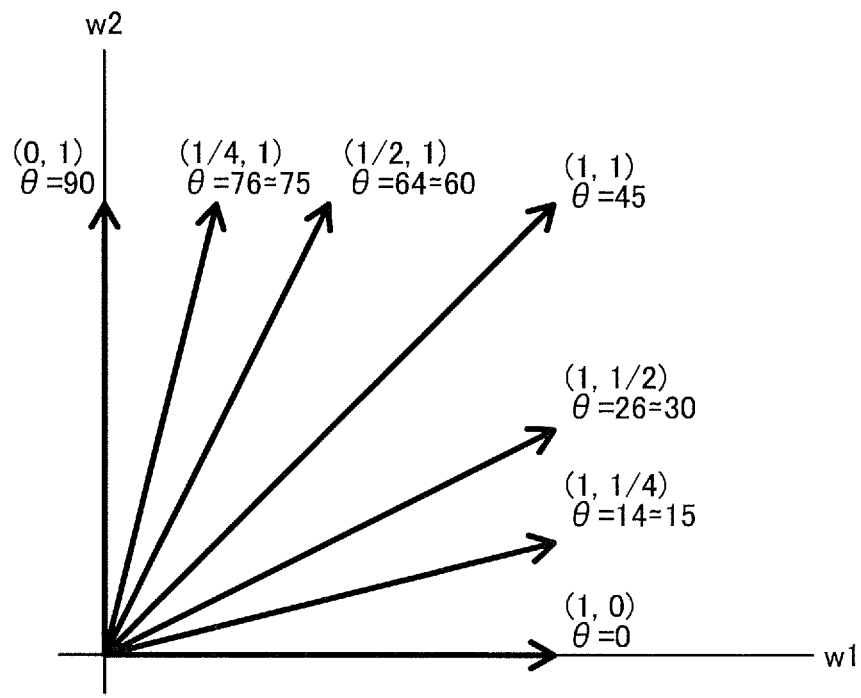
FIG. 4 is a diagram for explaining a quaternary-quantized weight vector in a two-dimensional space according to a related technology of the present disclosure.

Next, consider the case of quantizing the weight vector w into the quaternary values of {0, ¼, ½, 1}. FIG. 4 is a diagram for explaining the quaternary-quantized weight vector w in a two-dimensional space. In this case, the granularity of the weight vector w, or in other words the rotational angle θ, becomes approximately 15 degrees, making it possible to guarantee a finer granularity compared to the case of binary quantizing.

Figure 5:
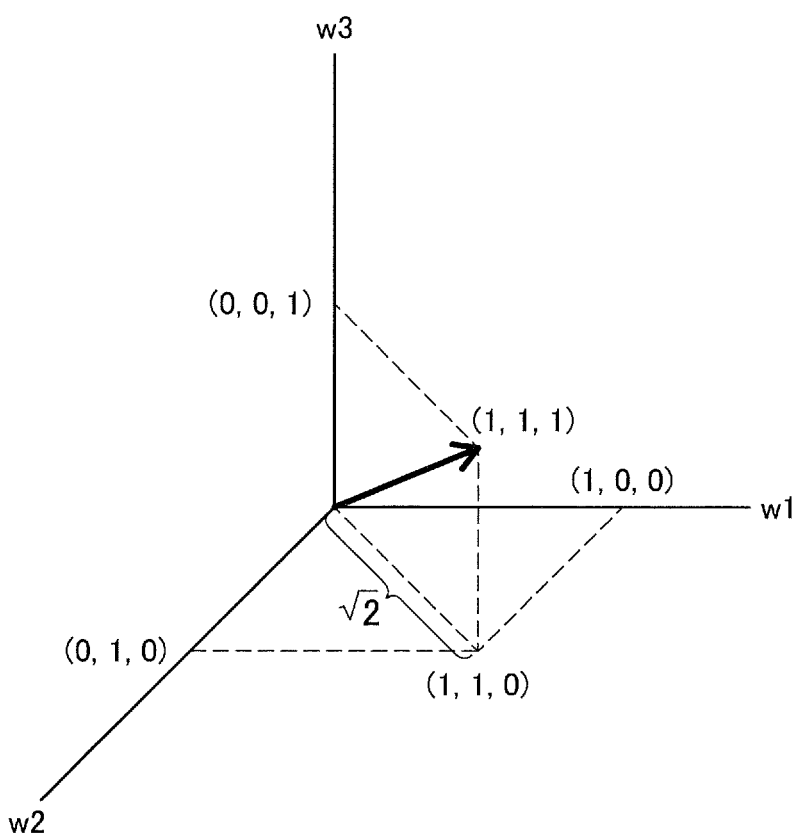
FIG. 5 is a diagram for explaining discrepancies in the granularity of a weight vector in a three-dimensional space according to a related technology of the present disclosure.

On the other hand, discrepancies in the granularity of the weight vector w are expected to become larger as the dimensionality increases. FIG. 5 is a diagram for explaining discrepancies in the granularity of the weight vector w in a three-dimensional space. For example, as illustrated in FIG. 5, in the case of considering the quantizing of the weight vector w in a plane defined by (1, 1, 0) and (0, 0, 1), the length of the side in the (1, 1, 0) direction becomes the length of the side in the (0, 0, 1) direction multiplied by the square root of 2, thereby demonstrating that discrepancies in the granularity during quantization increase.

Figure 6:
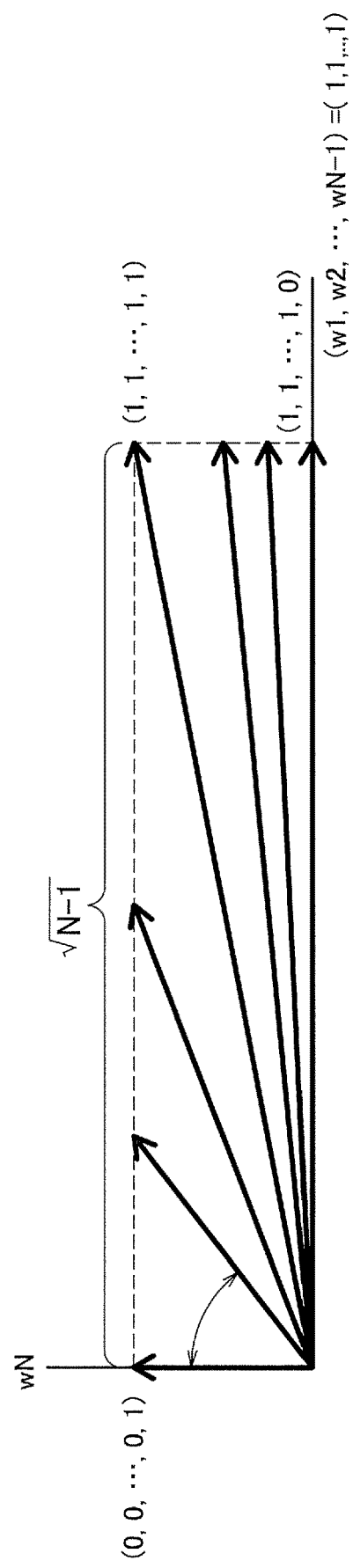
FIG. 6 is a diagram for explaining discrepancies in the granularity of a weight vector in an N-dimensional space according to a related technology of the present disclosure.

Also, these discrepancies, or in other words non-uniformity, of the granularity like the above become more prominent as the dimensionality increases. FIG. 6 is a diagram for explaining discrepancies in the granularity of the weight vector w in an N-dimensional space. FIG. 6 illustrates a plane defined by (1, 1, . . . , 1, 0) and (0, 0, . . . , 0, 1) in an N-dimensional space. In this case, the length of the side in the (1, 1, . . . , 1, 0) direction can be expressed by the length of the side in the (0, 0, . . . , 0, 1) direction multiplied by the square root of (N−1). For example, in the case of N=100, the length of the side in the 1, 1, . . . , 1, 0) direction becomes the length of the side in the (0, 0, . . . , 0, 1) direction multiplied, by the square root of 99 (≈10).

Since non-uniformity in the granularity associated with the weight vector w as above may be a factor causing a performance drop in a neural network, a more accurate quantization technique is desired. The technical idea according to the present disclosure was conceived by focusing on the above point, and makes it possible to reduce the processing load effectively while also maintaining high accuracy in the approximation of a weight vector in an N-dimensional space. For this reason, one feature of the information processing device and information processing method according to the first embodiment of the present disclosure is to execute an inner product operation using a weight vector quantized on the basis of the granularity of a vector direction in an N-dimensional hypersphere plane. The information processing device and information processing method according to the first embodiment of the present disclosure are capable of achieving both high approximation accuracy and a reduction in the processing load by quantizing the weight vector with a granularity that is not too fine and not too coarse. More specifically, the information processing device and information processing method according to the first embodiment of the present disclosure preferably executes an inner product operation using a weight vector expressed by exponentiation. Hereinafter, the above features included in the information processing device and the information processing method according to the first embodiment of the present disclosure will be described in detail.

<<1.2, Exemplary Functional Configuration of Information Processing Device 10>>

Figure 7:
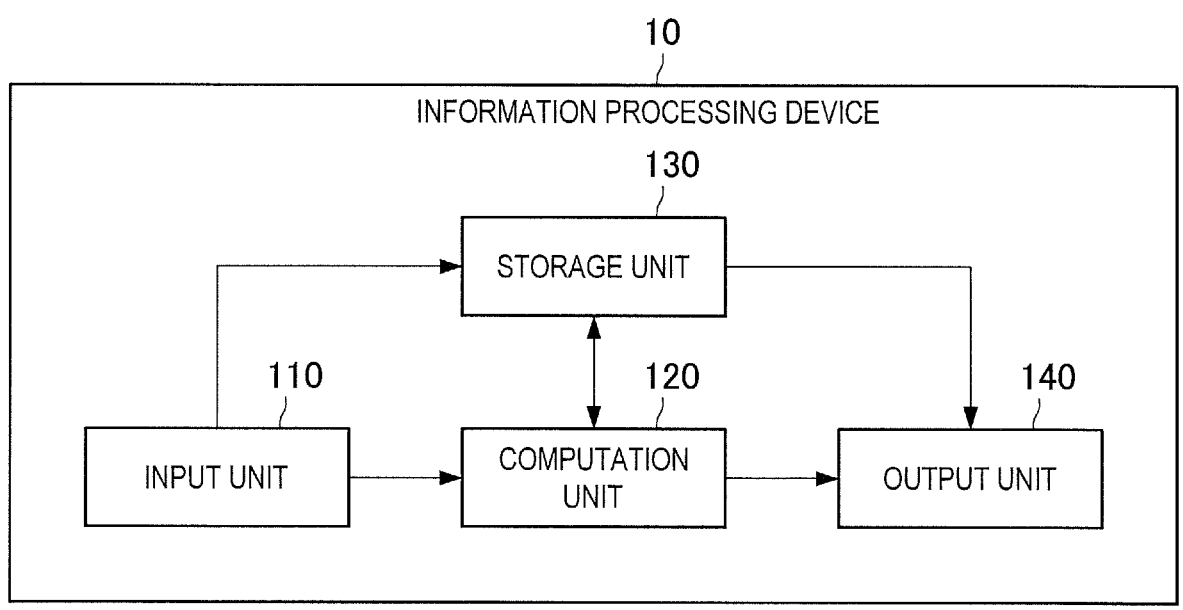
FIG. 7 is one example of a function block diagram of an information processing device according to one embodiment of the present disclosure.

Next, an exemplary functional configuration of the information processing device 10 that realizes the information processing method according to the present embodiment will be described. FIG. 7 is one example of a function block diagram of the information processing deice 10 according to the present embodiment. Referring to FIG. 7, the information processing device 10 according to the present embodiment is provided with an input unit 110, a computation unit 120, a storage unit 130, and an output unit 140. Hereinafter, the description of the above configuration will focus on the functions included in the configuration.

(Input Unit 110)

The input unit 110 according to the present embodiment has a function of detecting various types of input operations by an operator. For this reason, the input unit 110 according to the present embodiment preferably includes various devices for detecting input operations by the operator. For example, the input unit 110 may be realized by any of various types of buttons, a keyboard, a touch panel, a mouse, a switch, and the like.

(Computation Unit 120)

The computation unit 120 has a function of performing inner product operations based on multiple input values and multiple weight coefficients corresponding to each of the input values, and computing an output value. Particularly, the computation unit 120 according to the present embodiment performs inner product operations associated with the forward propagation of a neural network. At this point, one feature of the computation unit 120 according to the present embodiment is to compute an output value on the basis of weight coefficients quantized on the basis of the granularity of a vector direction on an N-dimensional hypersphere surface. More specifically, the computation unit 120 according to the present embodiment preferably computes an output value on the basis of weight coefficients expressed by exponentiation. The features of the inner product operations in the present embodiment will be described separately later.

(Storage Unit 130)

The storage unit 130 has a function of storing programs, data, and the like used by each configuration element provided in the information processing device 10. For example, the storage unit 130 according to the present embodiment stores various parameters and the like used in a neural network.

(Output Unit 140)

The output unit 140 has a function of outputting various information to the operator. For this reason, the output unit 140 according to the present embodiment may include a display device that outputs visual information. Herein, the above display device may be realized by a cathode ray tube (CRT) display device, a liquid crystal display (LCD) device, an organic light-emitting diode (OLED) device, or the like, for example.

The above describes an exemplary functional configuration of the information processing device 10 according to the present embodiment. Note that the exemplary functional configuration described above is merely one example, and the exemplary functional configuration of the information processing device 10 according to the present embodiment is not limited to such an example. The information processing device 10 according to the present embodiment may also be provided additionally with configuration elements other than those illustrated in FIG. 1. For example, the information processing device 10 may be provided additionally with a communication unit that communicates information with another information processing terminal, and the like. The functional configuration of the information processing device 10 according to the present embodiment may be flexibly changed in design.

<<1.3. Weight Vector Quantization>>

Next, the quantization of weight vectors according to the present embodiment will be described in detail. As described above, the information processing device 10 according to the present embodiment is able to maintain highly uniform granularity by executing quantization with weight vectors w expressed by exponentiation. At this point, one feature of the computation unit 120 according to the present embodiment is to reorder multiple weight vectors component $w_i$ in order of smallest value, and also normalize the multiple weight vectors component $w_i$ by the weight coefficient $w_i$ with the largest value. At this point, if the reordered and normalized weight vectors are taken to be $w_j$, the weight vectors $w_j$ are indicated by the following Formulas (2) to (4).

[Math. 2]

$$w_j = s_j \alpha^{n_i} (j<N) \quad (2)$$

$$w_N = 1 \quad (3)$$

$$w_j \leq w_{j+1} \quad (4)$$

However, at this point, in the above Formula (2), $\alpha$ preferably is $0<\alpha<1$, $s_j$ preferably is an element of the set $\{-1, 1\}$, and $n_j$ preferably is an element of the set $\{0, 1, 2, \ldots\}$. In other words, the computation unit 120 according to the present embodiment performs quantization treating $n_j$ as integers. In this case, the inner product operation executed by the computation unit 120 is indicated by the following Formula (5). Note that in the following Formula (5), K denotes a normalization constant. Also, it is sufficient for the value of $\alpha$ above to fall ultimately within the above range in the inner product operation, even in the case of appropriately transforming the following Formula (5). The formulas illustrated in the present disclosure are merely one example, and may be flexibly transformed.

[Math. 3]

$$K((\quad . \quad . \quad . \quad (s_1 x_1 \alpha^{n_1-n_2} + s_2 x_2)\alpha^{n_2-n_3} + s_3 x_3)\alpha^{n_3-n_4} + \ldots)\alpha^{n_{N-1}} + s_N x_N), K \in R \quad (5)$$

For this reason, the inner product operation by the computation unit 120 according to the present embodiment is expected to be processable by N addition operations and the number of times of multiplications on the order of $-\frac{1}{2} \log(N-1)/\log \alpha$.

In this way, one feature of the information processing method according to the present embodiment is to approximate the weight vectors w by an exponential representation of $\alpha$, and reorder the weight vectors w in order of smallest value. At this point, in the information processing method according to the present embodiment, by converting the exponents of $\alpha$ to t-ary values according to N, the weight vectors w are quantized.

For example, for the case in which N=100, in the information processing method according to the present embodiment, t=4 (2-bit), 8 (3-bit), 16 (4-bit) or the like may be adopted. By setting t as above, since most of $n_1$-$n_2$, $n_2$-$n_3$, $n_3$-$n_4$, and so on in Formula (5) above become 0 due to quantized by the same value, it becomes possible to greatly reduce the number of times of multiplications. To give a more specific example, in the case in which t=4 with respect to N=100, $n_{j-1}$-$n_j$ takes a value other than 0 only four times. For this reason, in the case of this example, the number of times of multiplications associated with the inner product operation is merely four while the rest become additions, making it possible to effectively reduce the processing load.

<<1.4. Exemplary Configuration of Multiply-Accumulate Operation Circuit>>

Next, a multiply-accumulate operation circuit that realizes the computational method according to the present embodiment will be described. As described above, in the case of quantizing according to an exponential representation and then reordering the weight vectors w, it is also necessary to correspondingly reorder the input vectors x corresponding to the weight vectors w.

For this reason, the information processing device 10 according to the present embodiment preferably is provided with a multiply-accumulate operation circuit including a table that holds address information of the input vectors x corresponding to the multiple weight vectors w reordered in order of smallest value.

Figure 8:
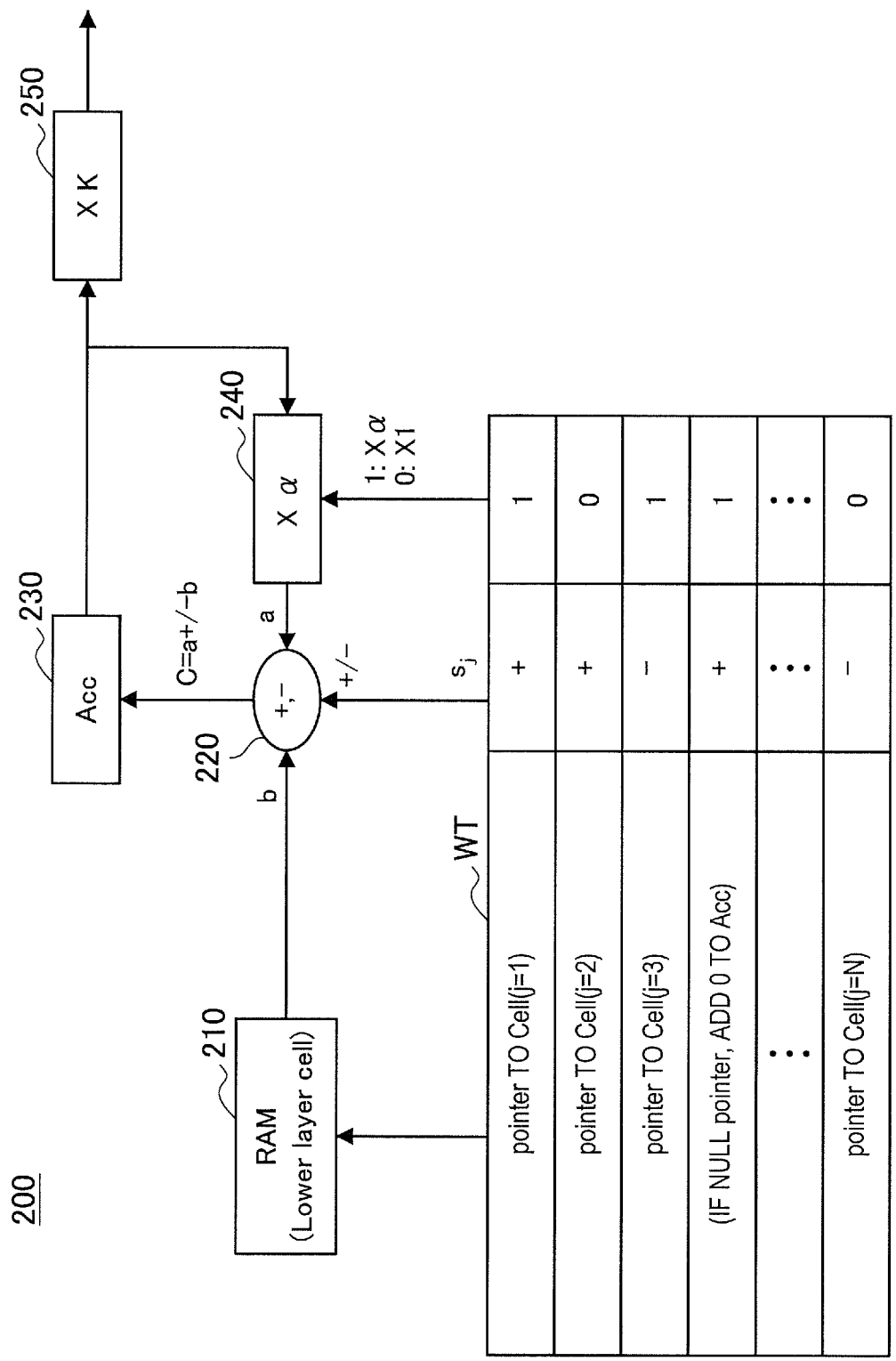
FIG. 8 is one example of a circuit block diagram of a multiply-accumulate operation circuit provided in the information processing device according to the embodiment.

FIG. 8 is one example of a circuit block diagram of a multiply-accumulate operation circuit 200 provided in the information processing device 10 according to the present embodiment. As illustrated in FIG. 8, the multiply-accumulate operation circuit according to the present embodiment is provided with a memory circuit that holds a table WT storing address information of the input vectors x corresponding to the weight vectors w, RAM 210, an addition circuit 220, an accumulator 230, a first multiplication circuit 240 that performs multiplications associated with $\alpha$, and a second multiplication circuit 250 that performs multiplications associated the normalization constant.

(Address Table WT)

The address table WT according to the present embodiment holds address information of the input vectors x corresponding to the multiple weight vectors w reordered in order of smallest value, sign information, and multiplication instruction information. Note that, as illustrated in FIG. 8, the above address information may also include a null pointer. In this case, 0 is added to the accumulator 230, making it possible to simply multiply the value of the accumulator 230 by $\alpha$. Also, the above sign information is information indicating a value corresponding to $S_j$ in Formula (5) described above.

Also, the above multiplication instruction information is information giving an instruction about the content of the processing by the first multiplication circuit 240. The multiplication instruction information according to the present embodiment preferably includes information designating whether or not to multiply, for example. FIG. 8 illustrates one example of a case in which the first multiplication circuit 240 does not multiply in the case in which the multiplication instruction information is 0, and the first multiplication circuit 240 multiplies by $\alpha$ in the case in which the multiplication instruction information is 1.

Note that the multiplication instruction information according to the present embodiment is not limited to the above example, and may include designating various types of processing content. For example, the multiplication instruction information according to the present embodiment may include information designating the number of times of multiplications, shift operations, or the like.

(RAM 210)

The RAM 210 according to the present embodiment outputs the input vectors x corresponding to the weight vectors w to the addition circuit 220 on the basis of address information input from the address table WT.

(Addition Circuit 220)

The addition circuit 220 according to the present embodiment executes addition on the basis of the input vectors component $x_j$ input from the RAM 210 and a value output from the first multiplication circuit 240. At this point, the addition circuit 220 according to the present embodiment performs the above addition on the basis of the sign information held in the address table WT.

(Accumulator 230)

The accumulator 230 according to the present embodiment accumulates the computational results output from the addition circuit 220. The accumulator 230 outputs the accumulated value to the first multiplication circuit 240 and the second multiplication circuit 250. Also, a reset signal for resetting the accumulated value to 0 is input into the accumulator 230 when appropriate.

(First Multiplication Circuit 240)

The first multiplication circuit 240 according to the present embodiment multiplies the value accumulated by the accumulator 230 by α. At this point, as described above, the first multiplication circuit 240 executes the above multiplication on the basis of the multiplication instruction information held in the address table WT. The first multiplication circuit 240 outputs the computational result to the addition circuit 220.

(Second Multiplication Circuit 250)

The second multiplication circuit 250 according to the present embodiment multiplies the value output from the accumulator 230 by the normalization constant K.

The above describes an exemplary configuration of the multiply-accumulate operation circuit 200 according to the present embodiment. With the multiply-accumulate operation circuit 200 according to the present embodiment, it becomes possible to effectively reduce the number of times of multiplications in inner product operations, and reduce the processing load.

Figures 9, 10:
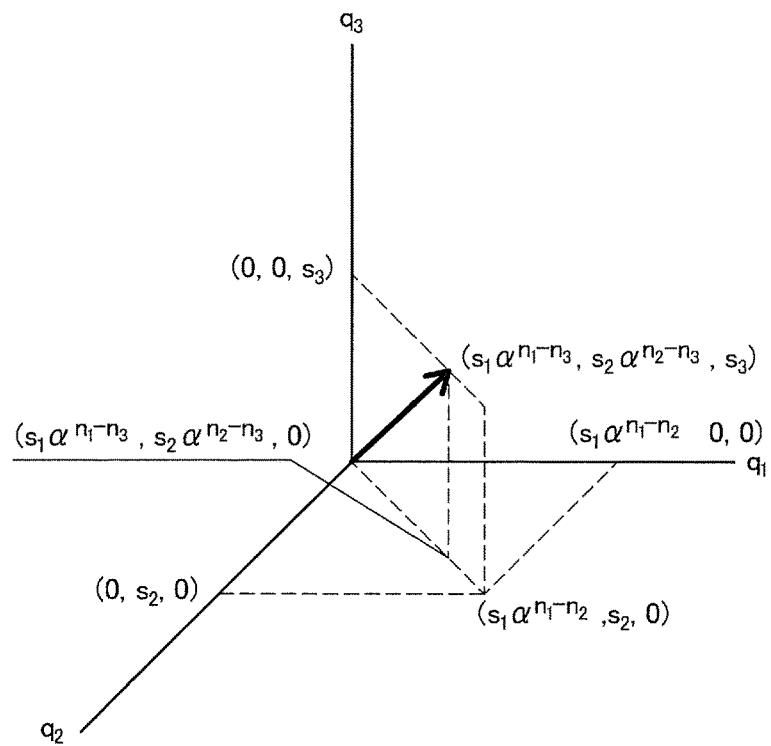
FIG. 9 is one example of an offset notation for address information stored in an address table according to the embodiment.
FIG. 10 is a diagram illustrating a process representation of the information processing method according to the embodiment.

On the other hand, since the capacity of the address table WT according to the present embodiment increases due to holding the address information of the input vectors x, power consumption is also expected to increase. For this reason, as illustrated in FIG. 9, the address table WT may also include offsets indicating relative positions between addresses. FIG. 9 is one example of an offset notation for address information stored in the address table WT according to the present embodiment.

As illustrated in FIG. 9, the address table WT according to the present embodiment may sort addresses in a segment where the value of $n_{j-1}-n_j$ in Formula (5) described above is continuously 0, or in other words, a segment in which multiplication is not performed, in order of address, and hold offsets between the addresses as address information. With the address table WT above according to the present embodiment, the amount of information associated with address information is greatly reduced, making it possible to effectively reduce power consumption.

Note that the address table WT according to the present embodiment may take a variety of modes other than the formats illustrated in FIGS. 8 and 9. For example, the address table WT according to the present embodiment does not have to hold the sign information and the multiplication instruction information with a clear separation between the two, and may also adopt an address compression method other than the above. The address table WT according to the present embodiment may be modified flexibly according to the configuration of the neural network and the performance of the information processing device 10.

<<1.5. Quantization during Learning>>

Next, the quantization of the weight vectors w during learning according to the present embodiment will be described. In the information processing method according to the present embodiment, it is possible to calculate the update of the weight vectors component $w_i$ during learning according to the following Formula (6).

[Math. 4]

$$n_i = \text{int}(\log|w_i/w_{max}|/\log \alpha) \quad (6)$$

However, $w_{max}$ in the above Formula (6) indicates the maximum value of $w_i$. Also, the integer function int may select to either round up or round down, whichever is closer. In the information processing method according to the present embodiment, by reordering $n_i$ during the final learning, the address table WT described above can be generated.

Note that in the case of setting α close to 1, it is also possible to adopt a technique of performing computations using a learning algorithm according to a deep neural network (DNN) using ordinary floating-point arithmetic and quantizing $w_i$ after learning ends. In other words, in the case of a small quantization granularity associated with the weight vectors w, an effect of not lowering the recognition accuracy even without modifying the network structure is anticipated.

<<1.6. Effects>>

Next, the effects exhibited by the quantization of weight vectors according to the present embodiment will be described in detail. As described above, in the information processing method according to the present embodiment, $w_j$ is defined by reordering the $w_i$ quantized by an exponential representation in order of smallest value and normalizing. At this point, if the reordered basis vectors are taken to be $q_j$, the weight vectors w are indicated by the following Formula (7).

[Math. 5]

$$\begin{aligned}w &= \sum w_j q_j \\ &= ((\ldots (s_1 q_1 \alpha^{n_1-n_2} + s_2 q_2) \alpha^{n_2-n_3} + s_3 q_3) \alpha^{n_3-n_4} + \ldots) \alpha^{n_{N-1}} + \\ & \quad s_N q_N)\end{aligned} \quad (7)$$

In other words, as illustrated in FIG. 10, the information processing method according to the present embodiment means creating vectors in the plane formed by the weight vectors projected onto the space stretched by $q_1, q_2, \ldots, q_{j-1}$ and $q_j$, and repeating a process of multiplying the vectors by $\alpha^{n_j-n_j+1}$. FIG. 10 is a diagram illustrating a process representation of the information processing method according to the present embodiment.

Figure 11:
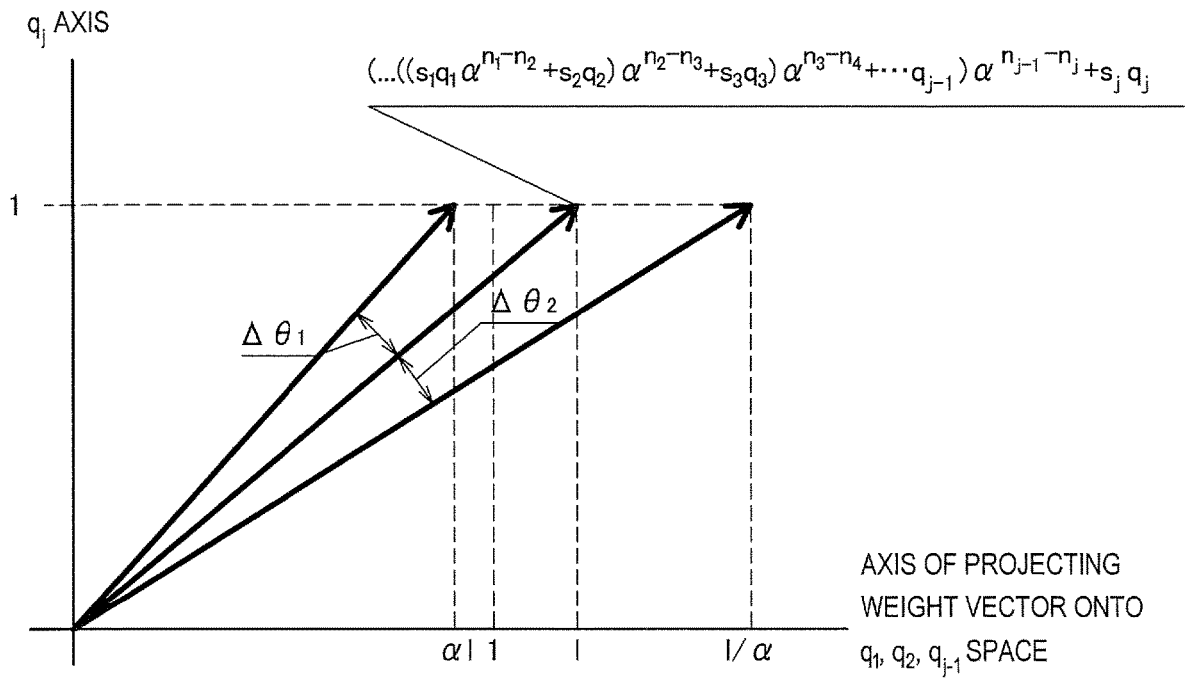
FIG. 11 is a diagram for explaining a quantization granularity Δθ according to the embodiment.

For this reason, in the information processing method according to the present embodiment, in the plane stretched by the axis obtained by projecting a weight vector onto the $q_1, q_2, \ldots, q_{j-1}$ space and $q_j$, as illustrated in FIG. 11, the quantization granularity Δθ of the weight vectors can be expressed as counter-clockwise rotation and clockwise rotation by each of the following Formulas (8) and (9). However, at this point, 1 in Formulas (8) and (9) is defined by Formula (10). FIG. 11 is a diagram for explaining the quantization granularity Δθ according to the present embodiment. Note that in FIG. 11, weight vectors projected onto the first quadrant are illustrated.

[Math. 6]

$$\Delta\theta_1 = \tan^{-1}\frac{1}{\alpha l} - \tan^{-1}\frac{1}{l} \qquad (8)$$

$$\Delta\theta_2 = \tan^{-1}\frac{1}{l} - \tan^{-1}\frac{\alpha}{l} \qquad (9)$$

$$l = \|( \ldots ((s_1 q_1 \alpha^{n_1-n_2} + s_2 q_2)\alpha^{n_2-n_3} + s_3 q_3)\alpha^{n_3-n_4} + \ldots q_{j-1}) \qquad (10)$$
$$\alpha^{n_{j-1}-n_j}\|$$

Also, in the case in which the quantization granularities $\Delta\theta_1$ and $\Delta\theta_2$ return 0 when differentiated by 1, the maximum value of each is defined according to the following Formula (11).

[Math. 7]

$$\Delta\theta_{1max} = \Delta\theta_{2max} = \tan^{-1}\frac{1}{\sqrt{\alpha}} - \tan^{-1}\sqrt{\alpha} \qquad (11)$$

Figure 12:
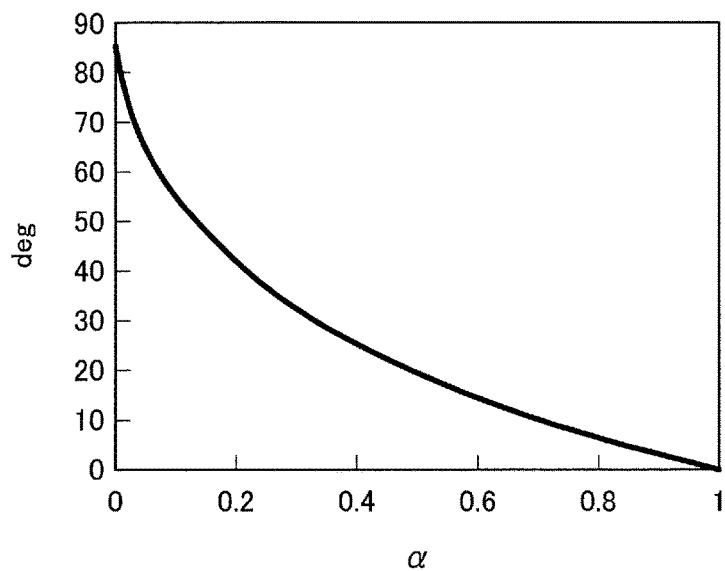
FIG. 12 is a graph illustrating a maximum value of the quantization granularity Δθ according to a according to the embodiment.

FIG. 12 is a graph illustrating the maximum value of the quantization granularity Δθ according to α according to the present embodiment. In this way, with the information processing method according to the present embodiment, in an N-dimensional space, the quantization granularity is guaranteed in all orthogonal rotation directions.

Figure 13:
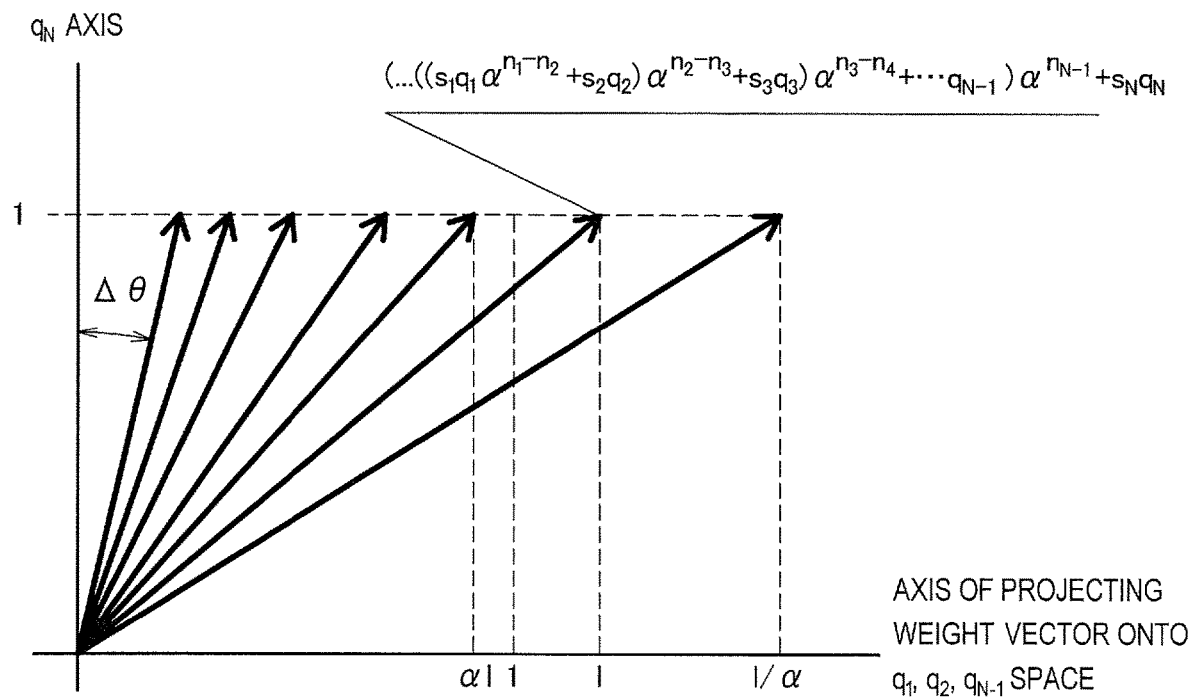
FIG. 13 is a diagram for explaining a maximum exponent according to the embodiment.

Note that in the case of stopping the exponentiation operation partway through, as illustrated in FIG. 13, the quantization granularity Δθ remains. FIG. 13 is a diagram for explaining a maximum exponent according to the present embodiment. Note that in FIG. 13, weight vectors projected onto the first quadrant are illustrated. At this point, for the maximum exponent guaranteeing the quantization granularity Δθ, it is sufficient to add the following Formula (13) to the smallest m satisfying the following Formula (12). Consequently, the number of times of multiplications executed by the information processing device 10 according to the present embodiment can be computed by the following Formula (14).

[Math. 8]

$$\tan^{-1}\alpha^m < \tan^{-1}\frac{1}{\sqrt{\alpha}} - \tan^{-1}\sqrt{\alpha} \qquad (12)$$

$$-\frac{1}{2}\frac{\log(N-1)}{\log\alpha} \qquad (13)$$

$$\frac{\log\left(\tan\left(\tan^{-1}\frac{1}{\sqrt{\alpha}} - \tan^{-1}\sqrt{\alpha}\right)\right)}{\log\alpha} - \frac{1}{2}\frac{\log(N-1)}{\log\alpha} + 1 \qquad (14)$$

Figure 14:
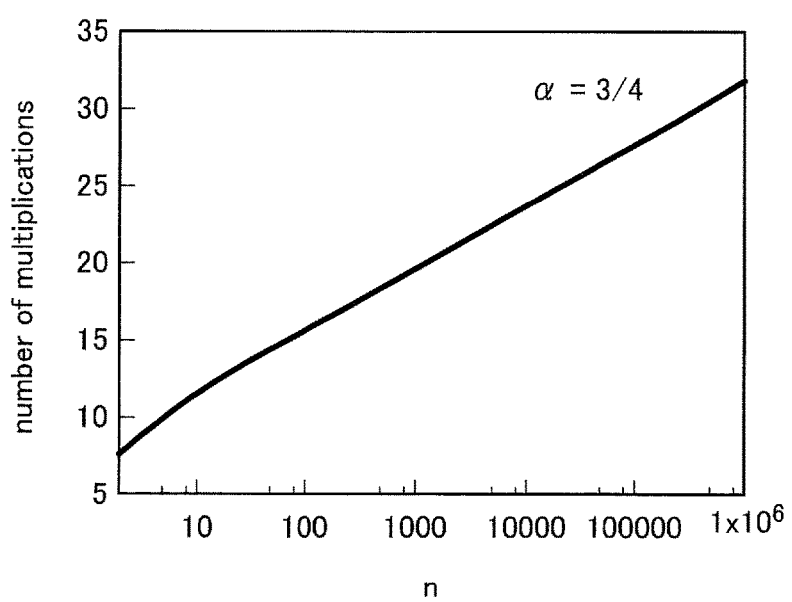
FIG. 14 is a diagram illustrating an example of the number of times of multiplications with respect to the number of inputs N according to the embodiment.
Figure 15:
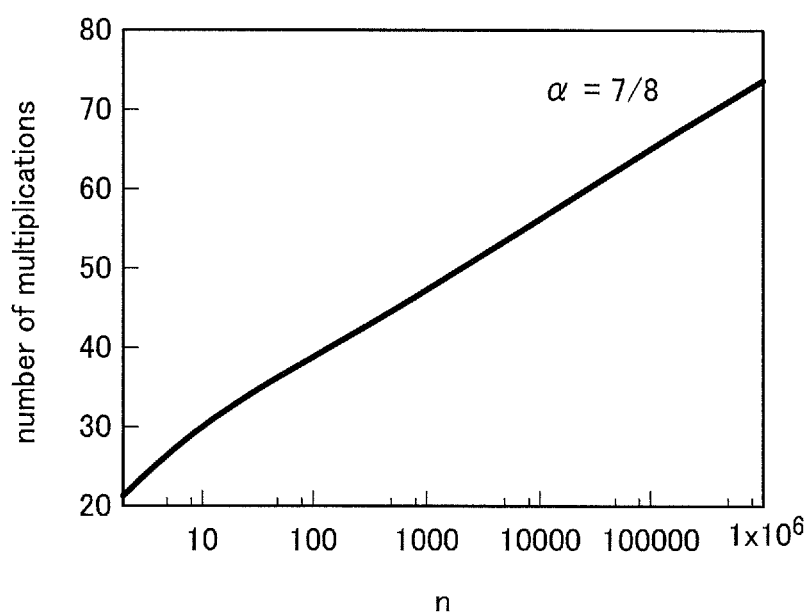
FIG. 15 is a diagram illustrating an example of the number of times of multiplications with respect to the number of inputs N according to the embodiment.

For example, in the case in which α=¾, the number of times of multiplications with respect to the number of inputs N is decided like the graph illustrated in FIG. 14. Also, for example, in the case in which α=⅞, the number of times of multiplications with respect to the number of inputs N is decided like the graph illustrated in FIG. 15. In other words, in the inner product operations by the computation unit 120 according to the present embodiment, the number of times of multiplications may be considered to be determined on the basis of the value of the base of the weight vectors. FIGS. 14 and 15 are diagrams illustrating examples of the number of times of multiplications with respect to the number of inputs N according to the present embodiment.

As described above, with the information processing device that realizes the information processing method according to the present embodiment, in the inner product operations in the forward propagation of the neural network, the number of times of multiplications can be reduced greatly, making it possible to effectively reduce power consumption by the multiply-accumulate operation circuit 200. Also, with the information processing device that realizes the information processing method according to the present embodiment, the quantization accuracy of the weight vectors can be improved, and compared to a quantization technique of the related art in which the same numbers of bits are used, an effect of improving the recognition accuracy and the approximation accuracy by the neural network is anticipated.

2. SECOND EMBODIMENT

<<2.1 Overview>>

Next, the second embodiment of the present disclosure will be described. The first embodiment above describes a technique in which, by expressing the weight vector component $w_j$ by $\alpha^n$, a high approximation accuracy is realized, while in addition, the number of times of multiplications in the inner product operation is reduced on the order of log.

However, although the technique in the first embodiment is effective in the case of a relatively high dimensionality of the inner product space, for inner product operations of relatively low dimensionality such as a convolutional neural network (CNN), cases in which the effect of reducing the processing load is not sufficient are also anticipated.

Accordingly, the second embodiment of the present disclosure proposes a computational circuit capable of effectively reducing the processing load of inner product operations, even in the case of a relatively low dimensionality of the inner product space.

Specifically, in the second embodiment of the present disclosure, the weight vector component $w_i$ and the input vector component $x_i$ preferably are expressed as $\alpha^{-n/p}$. In this case, assuming α=2, the values that $\alpha^{-n/p}$ may take can be expressed as in Table 1 below

TABLE 1

|  | p = 1 | p = 2 | p = 3 | p = 4 | p = 5 |
|---|---|---|---|---|---|
| n = 1 | 0.5 | 0.707107 | 0.793701 | 0.849896 | 0.870551 |
| n = 2 | 0.25 | 0.5 | 0.629961 | 0.707107 | 0.757858 |
| n = 3 | 0.125 | 0.353553 | 0.5 | 0.594604 | 0.659754 |
| n = 4 | 0.0625 | 0.25 | 0.39685 | 0.5 | 0.574349 |
| n = 5 | 0.03125 | 0.176777 | 0.31498 | 0.420448 | 0.5 |
| n = 6 | 0.015625 | 0.125 | 0.25 | 0.353553 | 0.435275 |
| n = 7 | 0.007813 | 0.088388 | 0.198425 | 0.297302 | 0.378929 |
| n = 8 | 0.003906 | 0.0625 | 0.15749 | 0.25 | 0.329877 |
| n = 9 | 0.001953 | 0.044194 | 0.125 | 0.210224 | 0.287175 |

In other words, the above Table 1 indicates that as the value of p increases, the quantization granularity can be decreased. For this reason, in the second embodiment of the present disclosure, by quantizing the weight vector component $w_i$ and the input vector component $x_i$ by $\alpha^{-n/p}$, it becomes possible to decrease the quantization error compared to the first embodiment. Also, with the computational technique according to the second embodiment of the present disclosure, it becomes possible to execute a process that is substantially the same as the inner product operation described in the first embodiment with only shift operations and additions, and effectively reduce the processing load of inner product operations.

<<2.2. Quantization of Weight Vectors>>

First, the technique will be described for the case of quantizing only the weight vectors w by $\alpha^{-n/p}$. Herein, a case will be described in which $\alpha=2$, p is an element of the set of natural numbers $\{1, 2, 3, \ldots\}$, and the inner product operation is performed according to Formula (15) below. Note that p corresponds to a divisor in the present disclosure. Also, $w_i$ in Formula (15) below is assumed to be expressed by Formula (16) below. Also, in Formula (16) below, it is assumed that $s_i$ is an element of the set $\{-1, 1\}$ and $n_i$ is an element of the set $\{0, 1, 2, \ldots\}$.

[Math. 9]

$$y = \sum_i x_i w_i \tag{15}$$

$$w_i = s_i 2^{-\frac{n_i}{p}} \tag{16}$$

At this point, assuming that w is normalized such that $|w_i| \leq 1$ for all $w_i$, and y is later multiplied by a normalization constant as necessary, the above Formula (15) can be expressed as in Formula (17) below. Also, herein, $y_r$ is defined by Formula (18) below.

[Math. 10]

$$y = \sum_i s_i x_i 2^{-\frac{n_i}{p}} \tag{17}$$

$$= \sum_{r=0}^{p-1} \left[ \sum_i s_i x_i 2^{-\lfloor \frac{n_i}{p} \rfloor} \delta_{r,(n_i \bmod p)} \right] 2^{-\frac{r}{p}}$$

$$y_r = \sum_i s_i x_i 2^{-\lfloor \frac{n_i}{p} \rfloor} \delta_{r,(n_j \bmod p)} \tag{18}$$

At this point, if it is assumed that $r \in \{0, 1, \ldots, p-1\}$, $\delta_{i,j}=1$ if $i=j$, otherwise 0, then $y_r$ becomes expressible by ordinary fixed-point notation with negative numbers expressed as two's complement. Also, $$x_i 2^{-\lfloor \frac{n_i}{p} \rfloor}$$

in Formula (18) above is calculable by right-shifting $x_i$, which is written in fixed-point notation with neimtive numbers expressed as two's complement, by $$\left\lfloor \frac{n_i}{p} \right\rfloor,$$

or in other words, by the integerized int($n_i$/p) as a signed binary number. In other words, the inner product operations associated with the input vectors x and the weight vectors w can be expressed as Formula (19) below.

[Math. 11]

$$y = \sum_{r=0}^{p-1} y_r 2^{-\frac{r}{p}} \tag{19}$$

Figure 16:
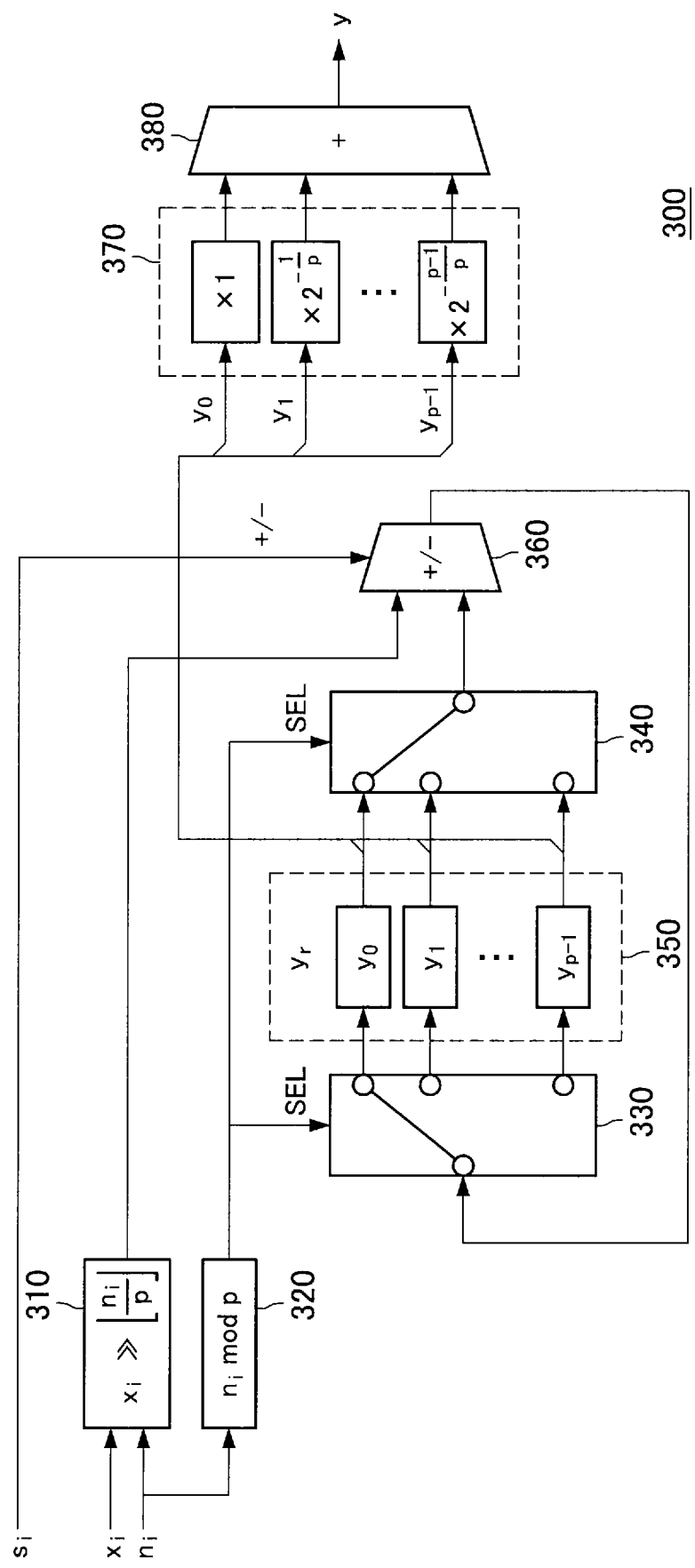
FIG. 16 is one example of the multiply-accumulate operation circuit in a case of quantizing the weight vectors according to a second embodiment of the present disclosure.

At this point, the inner product operation illustrated in Formula (19) above is achievable by the multiply-accumulate operation circuit 300 illustrated in FIG. 16, for example. FIG. 16 is one example of the multiply-accumulate operation circuit in a case of quantizing the weight vectors according to the present embodiment.

Referring to FIG. 16, the multiply-accumulate operation circuit 300 according to the present embodiment is provided with a shift operation unit 310, a modulo operation unit 320, selectors 330 and 340, an accumulator group 350, an adder-subtractor 360, a multiplier group 370, and an adder 380.

(Shift Operation Unit 310)

The shift operation unit 310 according to the present embodiment performs a shift operation based on the input vector component $x_i$ and $n_i$. Specifically, the shift operation unit 310 performs a bitwise right-shift of the input vector component $x_i$ by the value of int($n_i$/p).

(Modulo Operation Unit 320)

The modulo operation unit 320 according to the present embodiment performs the $n_i$ mod p operation on the basis of the input $n_i$, and outputs the value of the remainder to the selectors 330 and 340.

(Selectors 330 and 340)

The selectors 330 and 340 according to the present embodiment select an accumulator to connect the circuit to from among the multiple accumulators included in the accumulator group 350, on the basis of the computational result by the modulo operation unit 320. At this point, the selectors 330 and 340 according to the present embodiment work such that an accumulator corresponding to each value of the remainder is connected to the circuit. For example, in the case in which the remainder is 0, the selectors 330 and 340 work to connect the accumulator $y_0$ to the circuit, whereas in the case of a remainder of 1, the selectors 330 and 340 work to connect the accumulator $y_1$ to the circuit.

(Accumulator Group 350)

The accumulator group 350 according to the present embodiment is provided with multiple accumulators corresponding to each value of the remainder of $n_i$ mod p. In other words, the accumulator group 350 according to the present embodiment holds a $y_r$ for each value of the remainder.

(Adder-Subtractor 360)

The adder-subtractor 360 according to the present embodiment performs addition and subtraction based on the input the shift operation result, and the value of yr. At this point, as described above, the value of $y_r$ held in an accumulator selected on the basis of the value of the remainder of $n_i$ mod p is input into the adder-subtractor 360. Also, the $y_r$ in the selected accumulator is updated on the basis of the computational result by the adder-subtractor 360.

(Multiplier Group 370)

The multiplier group 370 according to the present embodiment multiplies $y_r$ updated for each remainder according to the process described above by an addition multiplier corresponding to the remainder. For this purpose, the multiplier group 370 according to the present embodiment includes multiple multipliers corresponding to each remainder of $n_i$ mod p. For example, the multiplier group 370 multiplies $y_0$ input from the accumulator group 350 by 1, and multiplies $y_1$ by $2^{-1/p}$.

(Adder 380)

The adder 380 according to the present embodiment adds up the values of $y_r$ calculated for each remainder by the multiplier group 370, and outputs a final computational result y.

The above describes the multiply-accumulate operation circuit 300 according to the present embodiment. As described above, with the multiply-accumulate operation circuit 300 according to the present embodiment, by accumulating each $y_r$ in accumulators corresponding to each remainder of $n_i$ mod p and finally performing multiplication collectively, it becomes possible to minimize the number of times of multiplications. Note that in the example illustrated in FIG. 16, the calculation is iterated over i to update $y_r$, but it is also possible to calculate by performing some or all of the above calculations in parallel.

<<2.3. Quantization of Both Weight Vectors and Input Vectors>>

Next, the technique for the case of quantizing both the weight vectors w and the input vectors x by $\alpha^{-n/p}$ will be described. Herein, a case will be described in which $\alpha=2$, p is an element of the set of natural numbers $\{1, 2, 3, \ldots\}$, and the inner product operation is performed. Herein, the input vector component $x_i$ and the weight vector component $w_i$ are assumed to be expressed by Formula (20) and Formula (21) below, respectively. Also, in Formulas (20) and (21) below it is assumed that $s_{xi}, s_{wi}$ are elements in the set $\{-1, 1\}$ and $n_i, m_i$ are elements in the set $\{0, 1, 2, \ldots\}$.

[Math. 12]

$$x_i = s_{x_i} 2^{-\frac{m_i}{p}} \quad (20)$$

$$w_i = s_{w_i} 2^{-\frac{n_i}{p}} \quad (21)$$

Herein, assuming that each of the input vectors x and the weight vectors w is normalized such that $|x_i| \leq 1$ and $|w_i| \leq 1$, and y is later multiplied by a normalization constant as necessary, the inner product operation can be expressed by Formula (22) below. Also, herein, $y_r$ is defined by Formula (23) below.

[Math. 13]

$$y = \sum_i s_{x_i} 2^{-\frac{m_i}{p}} \cdot s_{w_i} 2^{-\frac{n_i}{p}} \quad (22)$$

$$= \sum_i (s_{x_i} s_{w_i}) 2^{-\frac{(m_i+n_i)}{p}}$$

$$= \sum_{r=0}^{p-1} \left[ \sum_i (s_{x_i} s_{w_i}) 2^{-\left\lfloor \frac{(m_i+n_i)}{p} \right\rfloor} \delta_{r,((m_i+n_i) \bmod p)} \right] 2^{-\frac{r}{p}}$$

$$y_r = \sum_i (s_{x_i} s_{w_i}) 2^{-\left\lfloor \frac{(m_i+n_i)}{p} \right\rfloor} \delta_{r,((m_i+n_i) \bmod p)} \quad (23)$$

At this point, if r is an element of the set $\{0, 1, \ldots, p-1\}$, then it becomes possible to express $y_r$ in ordinary fixed-point notation with negative numbers expressed as two's complement. Note that in the above, p is described as preferably being a natural number, but p may also be expressed in an exponential representation. For example, in the case of setting $p=2^q$ where q is an element of the set $\{0, 1, 2, \ldots\}$, the calculations of $\text{int}((m_i+n_i)/p)$ and $(m_i+n_i)$ mod p become possible by bit truncation making division unnecessary, which has an effect of simplifying the calculations.

Figure 17:
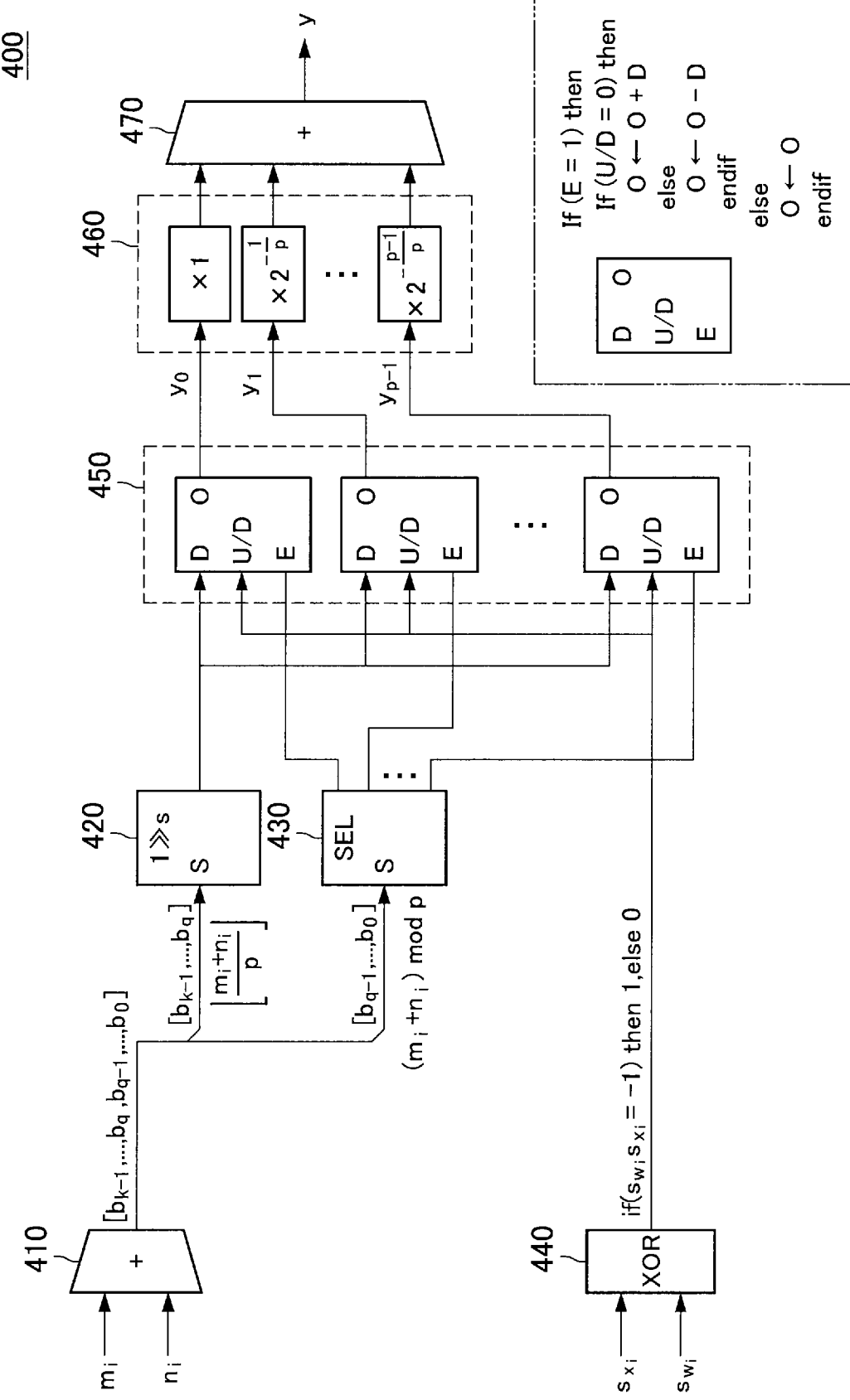
FIG. 17 is one example of the multiply-accumulate operation circuit in a case of quantizing both the weight vectors and the input vectors according to the same embodiment.

At this point, the inner product operation is achievable by the multiply-accumulate operation circuit 400 illustrated in FIG. 17, for example. FIG. 17 is one example of the multiply-accumulate operation circuit in a case of quantizing both the weight vectors and the input vectors according to the present embodiment.

Referring to FIG. 17, the multiply-accumulate operation circuit 400 according to the present embodiment is provided with a first adder 410, a shift operation unit 420, a selector 430, an XOR circuit 440, an accumulator group 450, a multiplier group 460, and a second adder 470.

(First Adder 410)

The first adder 410 according to the present embodiment adds together the input mi and ni. At this point, as illustrated in the diagram, the result of adding $m_i$ and $n_i$ can be expressed as the bit sequence $[b_{k-1}, \ldots b_q, b_{q-1}, \ldots b_0]$.

(Shift Operation Unit 420)

The shift operation unit 420 according to the present embodiment right-shifts 1 expressed in fixed-point notation by $\text{int}((m_i+n_i)/p)$, on the basis of the computation result by the first adder 410. At this time, the value of $\text{int}((m_i+n_i)/p)$ is the value of the most significant bits corresponding to $[b_{k-1}, \ldots, b_q]$ from the above bit sequence that is the computational result by the first adder 410. For this reason, the shift operation unit 420 preferably performs the shift operation using the value of the most significant bits.

(Selector 430)

The selector 430 according to the present embodiment selects an adder-subtractor to execute addition or subtraction from among multiple accumulators and adder-subtractors included in the accumulator group 450 on the basis of the value of the remainder of $(m_i+n_i)$ mod p, and inputs an Enable signal=1. At this point, since the above value of the remainder corresponds to $[b_{q-1}, \ldots, b_0]$ corresponding to the least significant q bits from the bit sequence that is the computational result by the first adder 410, it is possible to simplify computations similarly to the above.

(XOR Circuit 440)

The XOR circuit 440 according to the present embodiment inputs 1 or 0 into each accumulator of the accumulator group 450 on the basis of the input $S_{xi}$ and $S_{wi}$. Specifically, the XOR circuit 440 inputs 1 into each accumulator in the case in which $S_{wi}S_{xi}=-1$, and 0 in the case in which $S_{wi}S_{xi}=+1$.

(Accumulator Group 450)

The accumulator group 450 according to the present embodiment is provided with multiple accumulators corresponding to each value of the remainder of $(m_i+n_i)$ mod p. Also, the accumulator group 450 includes multiple adder-subtractors (1-bit up/down counters) corresponding to the accumulators.

At this point, as illustrated in the lower-right part of the diagram, each of the above adder-subtractors determines whether or not to add or subtract on the basis of the Enable signal input from the selector 430. Specifically, only in the case in which the input Enable signal is 1, each adder-subtractor adds or subtracts only 1 bit with respect to the value O held in the corresponding accumulator, in accordance with a U/D value input from the XOR circuit 440. With the accumulator group 450 according to the present embodiment, since it is possible to update the values of $y_r$ with 1-bit addition or subtraction on the most significant bits, an ordinary adder-subtractor becomes unnecessary, making it possible to reduce the circuit scale.

(Multiplier Group 460)

The multiplier group 460 according to the present embodiment multiplies $y_r$ updated for each remainder according to the process described above by a value corresponding to the remainder. For this purpose, the multiplier group 460 according to the present embodiment includes multiple multipliers corresponding to each remainder of $(m_i-n_i)$ mod p. For example, the multiplier group 460 multiplies $y_0$ input from the accumulator group 450 by 1, and multiplies $y_1$ by $2^{-1/p}$.

(Second Adder 470)

The second adder 470 according to the present embodiment adds up the values of $y_r$ calculated for each remainder by the multiplier group 460, and outputs a final computational result y.

The above describes the multiply-accumulate operation circuit 400 according to the present embodiment. As described above, with the multiply-accumulate operation circuit 300 according to the present embodiment, by accumulating each $y_r$ in accumulators corresponding to each remainder of $(m_i+n_i)$ mod p and finally performing multiplication collectively, it becomes possible to minimize the number of times of multiplications. Note that in the example illustrated in FIG. 17, the calculation is iterated over i to update $y_r$, but it is also possible to calculate by performing some or all of the above calculations in parallel.

Also, in the multiply-accumulate operation circuit 400 illustrated in FIG. 17, an example of a case of implementing multiple adder-subtractors (1-bit up/down counters) corresponding to the accumulators in parallel is described, but instead of the above configuration, the multiply-accumulate operation circuit 400 according to the present embodiment may also be provided with a selector and a single adder-subtractor like in the multiply-accumulate operation circuit 300 illustrated in FIG. 16. Also, similarly, it is possible to implement multiple adder-subtractors in parallel in the multiply-accumulate operation circuit 300. The configuration of the multiply-accumulate operation circuit according to the present embodiment may be designed appropriately such that the circuit scale becomes smaller according to the value of p.

Also, in the multiply-accumulate operation circuit 400 illustrated in FIG. 17, a case of selecting the adder-subtractor and accumulator on the basis of the least significant q bits of $(m_i+n_i)$ is described. On the other hand, Formula (22) above is transformable like Formula (24) below.

[Math. 14]

$$y = \sum_i (s_{x_i} s_{w_i}) 2^{-\frac{(m_i+n_i)}{p}} \quad (24)$$

$$= \sum_i (s_{x_i} s_{w_i}) 2^{-\frac{(m_i+n_i) \bmod p}{p}} 2^{-\lfloor \frac{m_i+n_i}{p} \rfloor}$$

Figure 18:
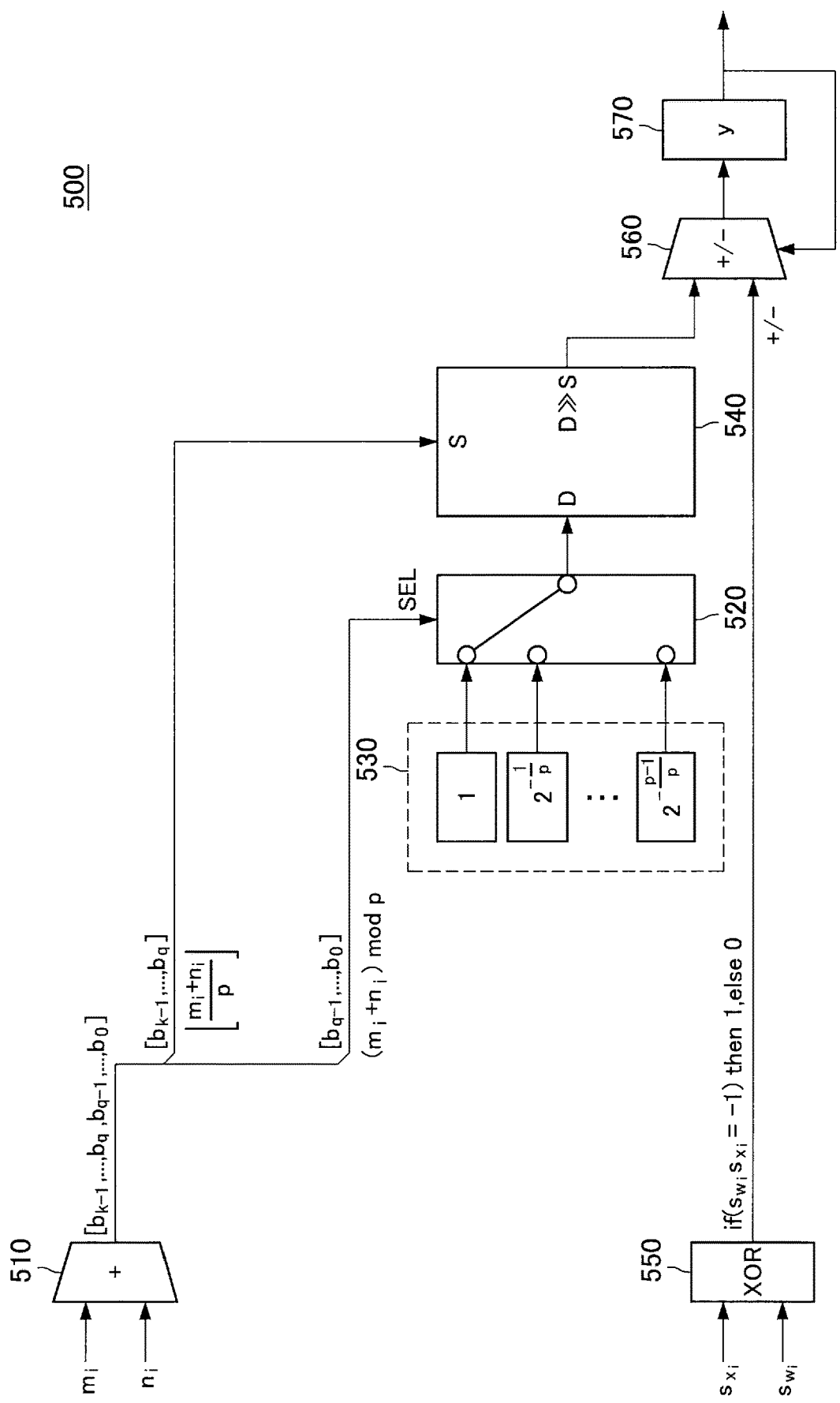
FIG. 18 is one example of the multiply-accumulate operation circuit in a case of quantizing both the weight vectors and the input vectors according to the same embodiment.

For this reason, the inner product operation is also achievable with a single adder-subtractor, like in the multiply-accumulate operation circuit 500 illustrated in FIG. 18. FIG. 18 is one example of the multiply-accumulate operation circuit in a case of quantizing both the weight vectors and the input vectors according to the present embodiment.

Referring to FIG. 18, the multiply-accumulate operation circuit 500 according to the present embodiment is provided with an adder 510, a selector 520, a memory circuit group 530, a shift operation unit 540, an XOR circuit 550, an adder-subtractor 560, and an accumulator 570.

(Adder 510)

The adder 510 according to the present embodiment adds together the input $m_i$ and $n_i$. The adder 510 preferably works similarly to the first adder 410 illustrated in FIG. 17.

(Selector 520)

The selector 520 according to the present embodiment selects a memory circuit to connect to the circuit from among multiple memory circuits included in the memory circuit group 530, on the basis of the value of $[b_{q-1}, \ldots, b_0]$ corresponding to the least significant q bits.

(Memory Circuit Group 530)

The memory circuit group 530 according to the present embodiment is provided with multiple memory circuits corresponding to each value of the remainder of $(m_i+n_i)$ mod p. In each memory circuit, an addition multiplier corresponding to each remainder is stored. Note that each memory circuit provided in the memory circuit group 530 may be a read-only circuit that holds the above addition multiplier as a constant, or may be a rewritable register. The case of storing the addition multipliers as constants in read-only circuits has a merit of simplifying the circuit configuration while also reducing power consumption.

(Shift Operation Unit 540)

The shift operation unit 540 according to the present embodiment right-shifts the addition multiplier stored in the connected memory circuit by the value of the most significant bits corresponding to $[b_{k-1}, \ldots, b_q]$.

(XOR Circuit 550)

The XOR circuit 550 according to the present embodiment outputs 1 or 0 on the basis of the input $S_{xi}$ and $S_{wi}$. The XOR circuit 550 preferably works similarly to the XOR circuit 440 illustrated in FIG. 17.

(Adder-Subtractor 560)

The adder-subtractor 560 according to the present embodiment repeatedly executes addition or subtraction on y held in the accumulator 570 based on the computational result by the shift operation unit 540 and the input from the XOR circuit 550.

(Accumulator 570)

The accumulator 570 according to the present embodiment holds the result y of the inner product operation.

As described above, with the multiply-accumulate operation circuit 500 according to the present embodiment, the inner product operation can be achieved with a single adder-subtractor 560 and a single accumulator 570, making it possible to reduce the circuit scale further.

Note that in the above description, a case of using a common p for the input vectors x and the weight vectors w is described as an example, but in the information processing method according to the present embodiment, it is also possible to use a different p between the input vectors x and the weight vectors w. In this case, the input vectors x and the weight vectors w can be expressed by Formulas (25) and (26) below, respectively.

[Math. 15]

$$x_i = s_{x_i} 2^{-\frac{m_i}{p_m}} \quad (25)$$

$$w_i = s_{w_i} 2^{-\frac{n_i}{p_n}} \quad (26)$$

At this point, $p_0$ is the least common multiple of $p_m$ and $p_n$, or in other words, if $ap_m=p_0$ and $bp_n=p_0$, the input vector component $x_i$ and the weight vector component $w_i$ are expressed by Formulas (27) and (28) below, respectively.

[Math. 16]

$$x_i = s_{x_i} 2^{-\frac{am_i}{p_0}} \quad (27)$$

$$w_i = s_{w_i} 2^{-\frac{bn_i}{p_0}} \quad (28)$$

Consequently, by replacing the operation of $m_i+n_i$ with $am_i+bn_i$, and additionally replacing p with $p_0$, calculation becomes possible similarly to the above description, even in the case in which p is different. Also, in the case of expressing $p_m$ and $p_n$ in an exponential representation, each of $am_i$ and $bn_i$ can be computed by shift operations.

Next, the method of quantizing the input vectors x according to the present embodiment will be described in detail. In the case of quantizing both the input vectors x and the weight vectors w, although the quantization of the weight vectors w can be calculated in advance, the quantization of the input vectors x must be performed at runtime. For this reason, a technique of achieving quantization of the input vectors x with a small-scale computational circuit is demanded.

Here, let $|x_i| \le 1$ be the bit sequence $c=[c_{k-1}, \ldots c_0]$. Note that c is a fixed-point notation in which $c_{k-1}$ corresponds to 1.

At this point, let L be the number of bits that are continuously 0 from the most significant bit (msb) of c. Also, let d be the bit sequence obtained by left-shifting $c=[c_{k-1}, \ldots c_0]$ by L bits, and treat this bit sequence in fixed point notation with the msb set to 0.5.

Next, let $r_{min}$ be the minimum r that satisfies Formula (29) below. Note that herein, r is an element of the set $\{0, \ldots, p-1\}$, but in the case in which a minimum r is not found, $r_{min}=p$ is set preferably. Here, if $m_i$ is defined according to Formula (30) below, $|x_i|$ can be approximated, that is, quantized, as Formula (31) below.

[Math. 17]

$$d \ge 2^{-\frac{r+1/2}{p}} \quad (29)$$

$$m_i = p(L-1) + r_{min} \quad (30)$$

$$|x_i| \approx 2^{-\frac{m_i}{p}} \quad (31)$$

Note that the calculation described above is achievable by providing a configuration that counts the number of bits that are continuously 0 from the msb of c as L, and a configuration that compares against a fixed value p times.

<<2.4 Effects>>

Next, the effects exhibited by the quantization of the weight vectors w and the input vectors x according to the present embodiment will be described in detail. Herein, in the case of quantizing the weight vector component $w_i$ and the input vector component $x_i$ as $\pm 2^{-n/p}$, the case of p=1, or in other words the case of using the quantization technique described in the first embodiment, and the case of p=2, or in other words the case of using the quantization technique of the present embodiment, were compared.

Specifically, an experiment was performed in which, after learning the weight vectors w and the input vectors x by float, the obtained coefficients are quantized to the nearest quantization point by each value of p, and compared to the image recognition rate in the case of estimating without retraining.

Note that for the data set, the CIFAR-10 image set (categorized into 10 classes, training data=50000 images, test data=10000 images) was adopted.

Figure 19:
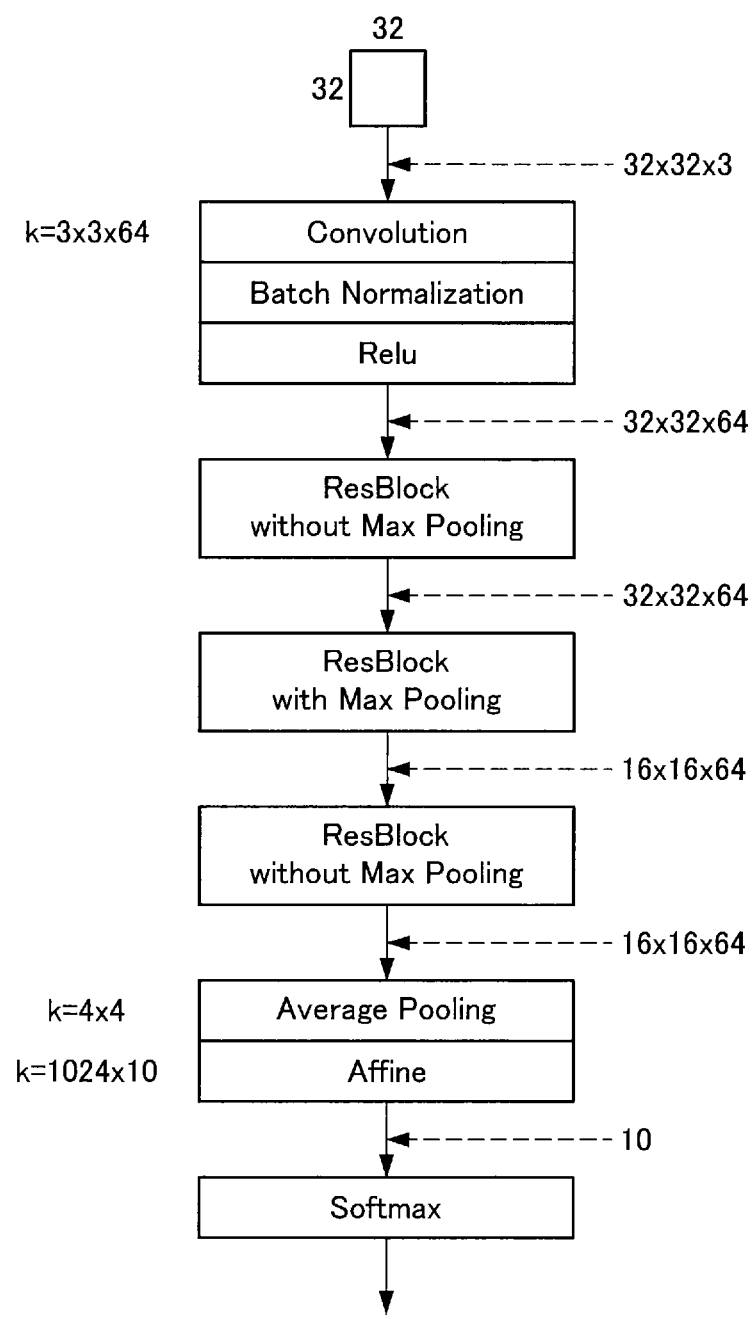
FIG. 19 is a diagram illustrating a network structure of a ResNet used in a comparative experiment according to the same embodiment.
Figure 20:
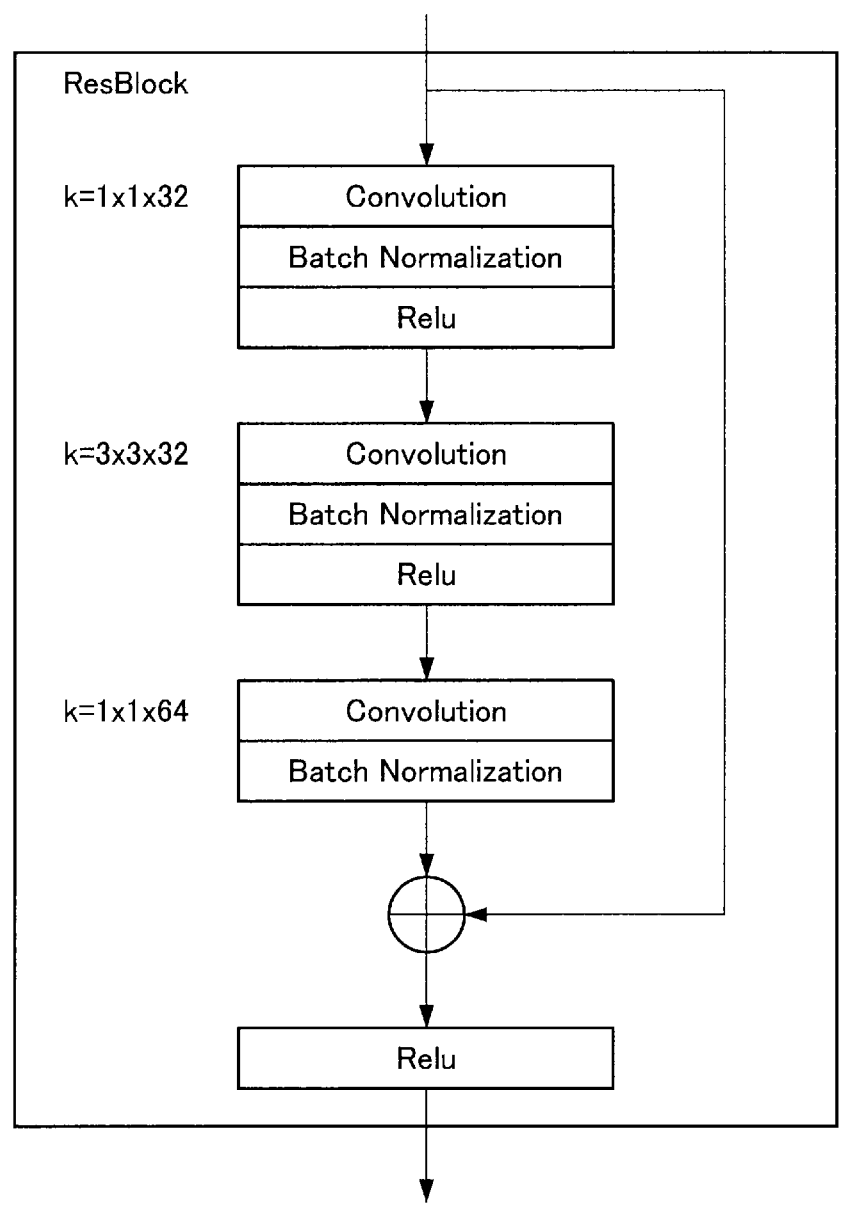
FIG. 20 is a diagram illustrating a ResNet network configuration that does not include a Max Pooling layer according to the same embodiment.
Figure 21:
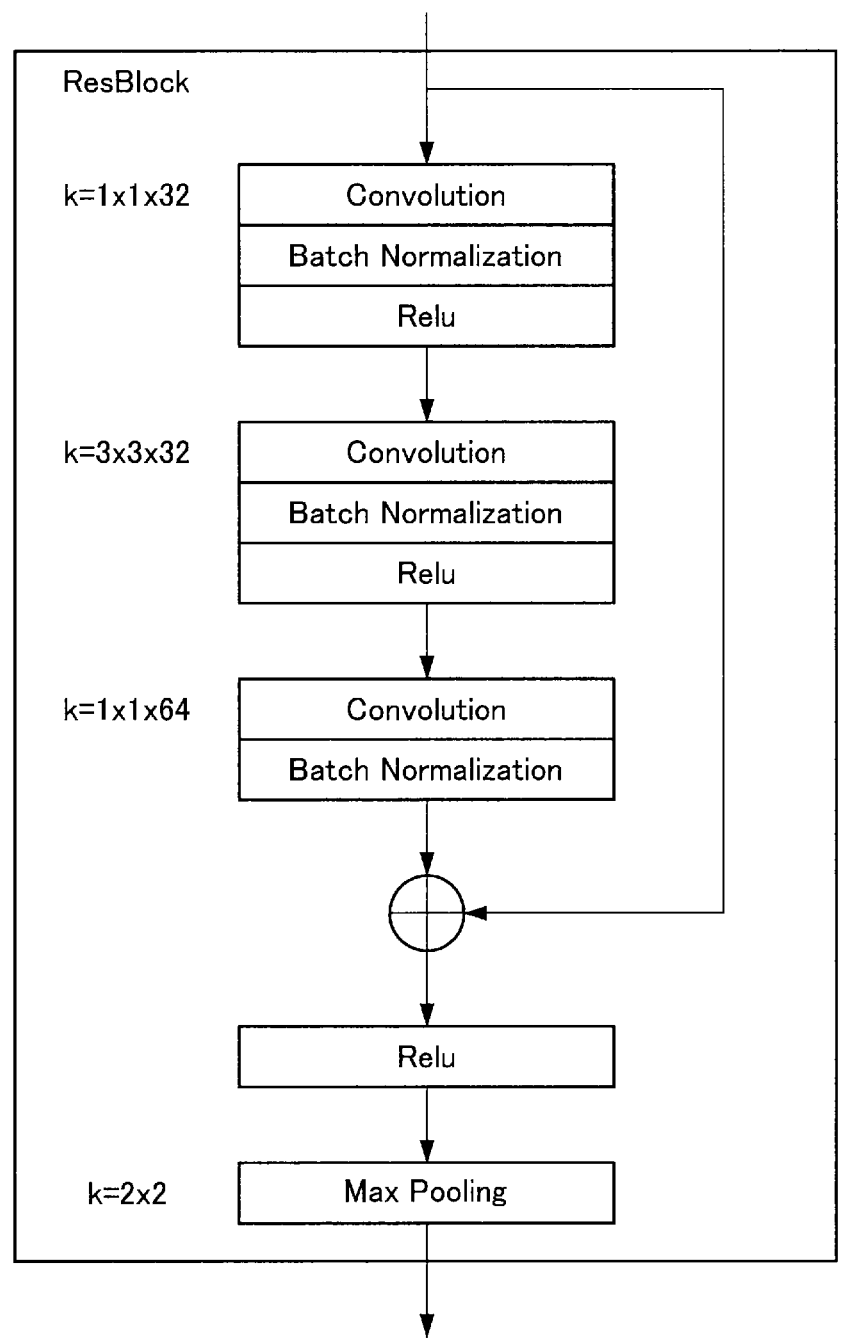
FIG. 21 is a diagram illustrating a ResNet network configuration that includes a Max Pooling layer according to the same embodiment.

Also, for the network, an 11-layer ResNet based on ResNet-23 was used. FIG. 19 is a diagram illustrating the network structure of the ResNet used in the comparative experiment according to the present embodiment. In FIG. 19, the input size input into each layer is indicated on the right side of the diagram, while each kernel size is indicated on the left side. Also, as illustrated in FIG. 19, the created network includes both a ResBlock that does not include a Max Pooling layer and a ResBlock that includes a Max Pooling layer. FIGS. 20 and 21 are diagrams illustrating the network configuration of a ResBlock that does not include a Max Pooling layer and a ResBlock that includes a Max Pooling layer, respectively.

Next, the technique of quantizing the weight vectors w and the input vectors x used in the experiment will be described in detail.

First, the data in the case of quantizing by p=1 will be described. Herein, in the quantization of the weight vectors w, 32 values of n from −3 to 12 (16 values×2±) were used. In this case, the values that the quantized weight vector component $w_i=\pm(2^{-n})$ may take are as illustrated in Table 2 below

TABLE 2

| | n | | | | | | | |
|---|---|---|---|---|---|---|---|---|
| | −3 | −2 | −1 | 0 | 1 | 2 | 3 | 4 |
| $\pm 2^{-n}$ | ±8 | ±4 | ±2 | ±1 | ±0.5 | ±0.25 | ±0.125 | ±0.0625 |
| | n | | | | | | | |
| | 5 | 6 | 7 | 8 | 9 | 10 | 11 | 12 |
| $\pm 2^{-n}$ | ±0.03125 | ±0.015625 | ±0.007813 | ±0.003906 | ±0.001953 | ±0.000977 | ±0.000488 | ±0.000244 |

Also, in the quantization of the input vectors x, before the input into the Relu block, three different quantizations with 16 values of n from −4 to 3 (8 values×2±), 32 values of n from −4 to 11 (16 values×2±), and 64 values of n from −4 to 27 (32 values×2±) are performed. In this case, the values that the quantized input vector component $x_i = \pm(2^{-n})$ may take are as illustrated in Tables 3 to 5 below.

TABLE 3

| | | | | n | | | | |
|---|---|---|---|---|---|---|---|---|
| | −4 | −3 | −2 | −1 | 0 | 1 | 2 | 3 |
| $\pm 2^{-n}$ | ±16 | ±8 | ±4 | ±2 | ±1 | ±0.5 | ±0.25 | ±0.125 |

TABLE 4

| | | | | n | | | | |
|---|---|---|---|---|---|---|---|---|
| | −4 | −3 | −2 | −1 | 0 | 1 | 2 | 3 |
| $\pm 2^{-n}$ | ±16 | ±8 | ±4 | ±2 | ±1 | ±0.5 | ±0.25 | ±0.125 |
| | | | | n | | | | |
| | 4 | 5 | 6 | 7 | 8 | 9 | 10 | 11 |
| $\pm 2^{-n}$ | 0.0625 | ±0.03125 | ±0.015625 | ±0.007813 | ±0.003906 | ±0.001953 | ±0.000977 | ±0.000488 |

TABLE 5

| | | | | n | | | | |
|---|---|---|---|---|---|---|---|---|
| | −4 | −3 | −2 | −1 | 0 | 1 | 2 | 3 |
| $\pm 2^{-n}$ | ±16 | ±8 | ±4 | ±2 | ±1 | ±0.5 | ±0.25 | ±0.125 |
| | | | | n | | | | |
| | 4 | 5 | 6 | 7 | 8 | 9 | 10 | 11 |
| $\pm 2^{-n}$ | 0.0625 | ±0.03125 | ±0.015625 | ±0.007813 | ±0.003906 | ±0.001953 | ±0.000977 | ±0.000488 |
| | | | | n | | | | |
| | 12 | 13 | 14 | 15 | 16 | 17 | 18 | 19 |
| $\pm 2^{-n}$ | ±0.000244 | ±0.000122 | ±6.10E−05 | ±3.05E−05 | ±1.63E−05 | ±7.63E−06 | ±3.81E−06 | ±1.91E−06 |
| | | | | n | | | | |
| | 20 | 21 | 22 | 23 | 24 | 25 | 26 | 27 |
| $\pm 2^{-n}$ | ±9.54E−07 | ±4.77E−07 | ±2.38E−07 | ±1.19E−07 | ±6.96E−08 | ±2.98E−08 | ±1.49E−08 | ±7.45E−09 |

Next, the data in the case of p=2, or in other words the case of quantizing using the technique according to the present embodiment will be described. Herein, in the quantization of the weight vectors w, 32 values of n from −6 to 9 (16 values×2±) were used. In this case, the values that the quantized weight vector component $w_i = \pm(2^{-n/2})$ may take are as illustrated in Table 6 below.

TABLE 6

| | n | | | | | | | |
|---|---|---|---|---|---|---|---|---|
| | −6 | −5 | −4 | −3 | −2 | −1 | 0 | 1 |
| $\pm 2^{-n/2}$ | ±8 | ±5.656854 | ±4 | ±2.828427 | ±2 | ±1.414214 | ±1 | ±0.707107 |
| | n | | | | | | | |
| | 2 | 3 | 4 | 5 | 6 | 7 | 8 | 9 |
| $\pm 2^{-n/2}$ | ±0.5 | ±0.363553 | ±0.25 | ±0.176777 | ±0.125 | ±0.088388 | ±0.0625 | ±0.044194 |

Also, in the quantization of the input vectors x, before the input into the Relu block, three different quantizations with 16 values of n from −8 to −1 (8 values×2±), 32 values of n from −8 to 7 (16 values×2±), and 64 values of n from −8 to 23 (32 values×2±) are performed. In this case, the values that the quantized input vector component $x_i = \pm(2^{-n/2})$ may take are as illustrated in Tables 7 to 9 below.

TABLE 7

| | n | | | | | | | |
|---|---|---|---|---|---|---|---|---|
| | −8 | −7 | −6 | −5 | −4 | −3 | −2 | −1 |
| $\pm 2^{-n/2}$ | ±16 | ±11.31371 | ±8 | ±5.656854 | ±4 | ±2.828427 | ±2 | ±1.414214 |

TABLE 8

| | n | | | | | | | |
|---|---|---|---|---|---|---|---|---|
| | −8 | −7 | −6 | −5 | −4 | −3 | −2 | −1 |
| $\pm 2^{-n/2}$ | ±16 | ±11.31371 | ±8 | ±5.656854 | ±4 | ±2.828427 | ±2 | ±1.414214 |
| | n | | | | | | | |
| | 0 | 1 | 2 | 3 | 4 | 5 | 6 | 7 |
| $\pm 2^{-n/2}$ | ±1 | ±0.707107 | ±0.5 | ±0.363553 | ±0.25 | ±0.176777 | ±0.125 | ±0.088388 |

TABLE 9

| | n | | | | | | | |
|---|---|---|---|---|---|---|---|---|
| | −8 | −7 | −6 | −5 | −4 | −3 | −2 | −1 |
| $\pm 2^{-n/2}$ | ±16 | ±11.31371 | ±8 | ±5.656854 | ±4 | ±2.828427 | ±2 | ±1.414214 |
| | n | | | | | | | |
| | 0 | 1 | 2 | 3 | 4 | 5 | 6 | 7 |
| $\pm 2^{-n/2}$ | ±1 | ±0.707107 | ±0.5 | ±0.363553 | ±0.25 | ±0.176777 | ±0.125 | ±0.088388 |
| | n | | | | | | | |
| | 8 | 9 | 10 | 11 | 12 | 13 | 14 | 15 |
| $\pm 2^{-n/2}$ | ±0.0625 | ±0.044194 | ±0.03125 | ±0.022007 | ±0.015625 | ±0.011049 | ±0.007813 | ±0.005524 |
| | n | | | | | | | |
| | 16 | 17 | 18 | 19 | 20 | 21 | 22 | 23 |
| $\pm 2^{-n/2}$ | ±0.003906 | ±0.002762 | ±0.001953 | ±0.001381 | ±0.000977 | ±0.000691 | ±0.000488 | ±0.00345 |

Figure 22:
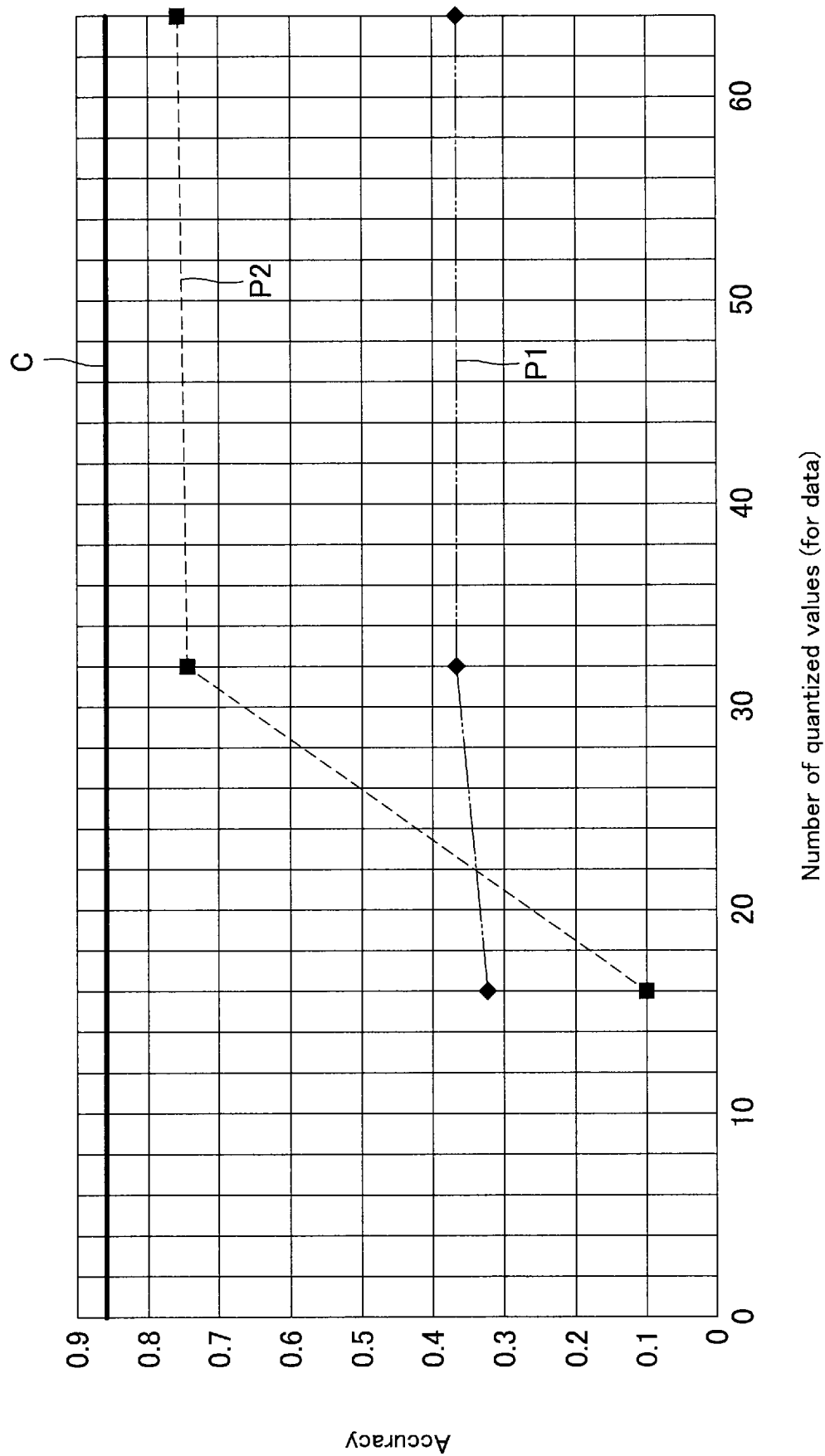
FIG. 22 is a diagram illustrating a result of comparing image recognition rate according to the same embodiment.

The comparison results of the image recognition rate in the case of performing estimation without retraining by the quantization described above are illustrated in FIG. 22. In FIG. 22, the recognition accuracy is indicated on the vertical axis, while the number of quantized values (N values) of the input vectors x is indicated on the horizontal axis. Also, in FIG. 22, the recognition accuracy before quantization is indicated by the line segment C, the recognition accuracy in the case of quantizing by p=1 is indicated by the line segment P1, and the recognition accuracy in the case of quantizing by p=2 is indicated by the line segment P2.

Herein, a comparison of the line segments P1 and P2 demonstrates that in the case of 32 or 64 quantized values of the input vectors x, quantizing by p=2 significantly improves the recognition accuracy over quantizing by p=1. Also, a comparison of the line segments P2 and C demonstrates that a large degradation in the recognition accuracy is not observed. In other words, this illustrates how, in the case in which there is a sufficient number of quantized values of the input vectors x, by adopting the quantization technique according to the present embodiment, even if retraining is not performed, it is possible to maintain a high recognition accuracy.

In this way, with the quantization method according to the present embodiment, it becomes possible to effectively reduce the processing load in inner product operations while also maintaining high performance of the learning unit.

<<2.5. Example of Application to Communication Technology>>

Next, the application of the quantization technique according to the present embodiment to other fields will be described. In the above description, the case of applying the quantization technique according to the present embodiment to inner product operations associated with the forward propagation of a neural network was described. On the other hand, the quantization technique according to the present embodiment is not limited to the above example, and is also applicable to a variety of technologies that perform inner product operations.

For example, the quantization technique according to the present embodiment may also be applied to convolution operations in a bandpass filter used in the field of communication technology. Hereinafter, a simulation result when applying the quantization technique according to the present embodiment to a handpass filter will be described.

Figure 23:
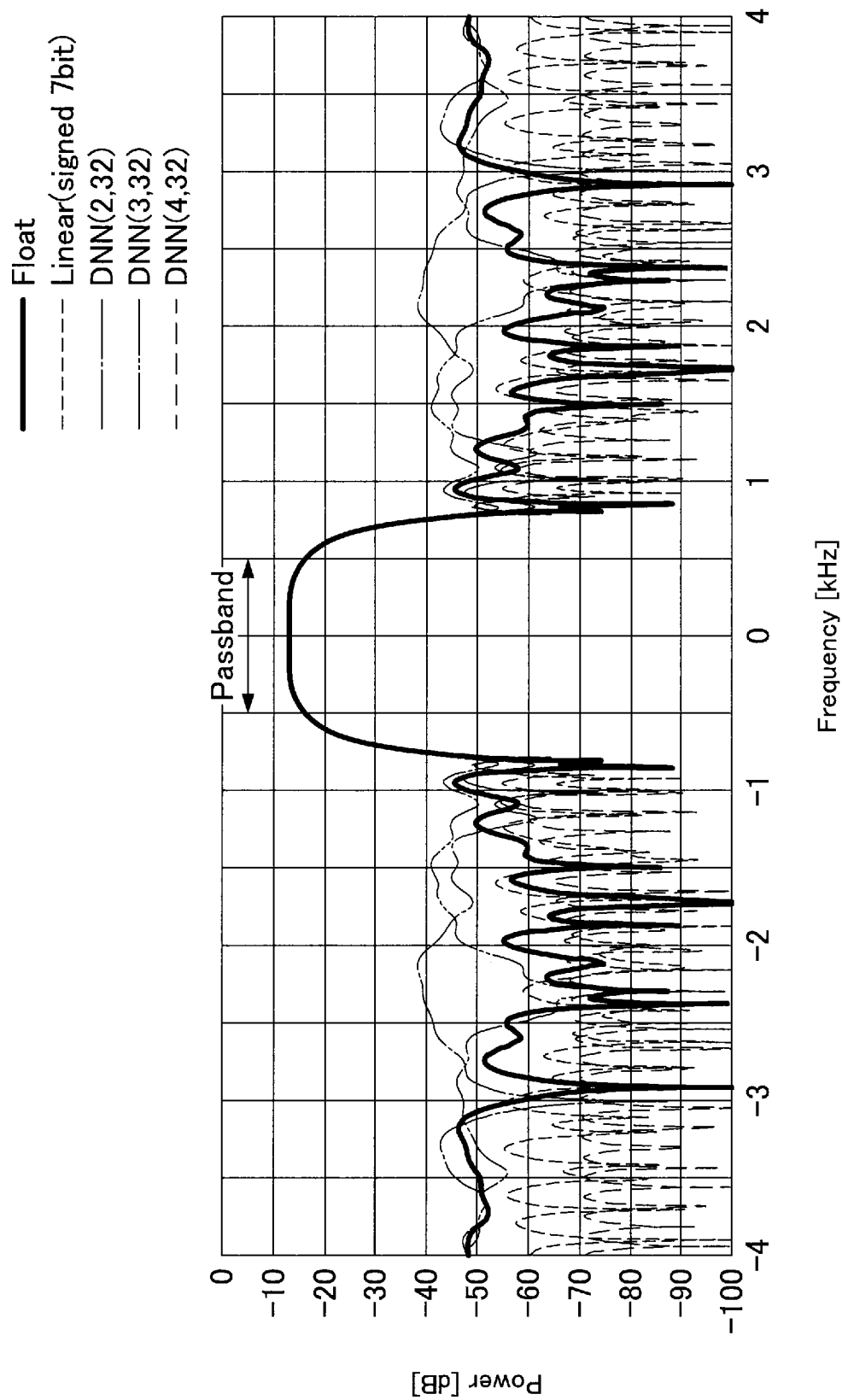
FIG. 23 is a diagram illustrating a simulation result according to frequency characteristics (gain characteristics) when the quantization technique according to the same embodiment is applied to a bandpass filter.

FIG. 23 is a diagram illustrating a simulation result according to frequency characteristics (gain characteristics) when the quantization technique according to the present embodiment is applied to a handpass filter. Herein, the coefficients (63 tap, rolloff 0.5) of a root-raised cosine (RRC) filter are quantized.

Note that in the quantization, 32 values (0 to 31) are used for each of p=2, 3, 4. In the diagram, this is illustrated as DNN(p,32). Additionally, as a comparison, the simulation results in the case of using floating point (Float) and integer (Linear) are illustrated as well.

Herein, referring to FIG. 23, it is demonstrated that even in the case of applying the quantization technique according to the present embodiment, the flat characteristics inside the passband are not degraded. On the other hand, focusing on the sidebands demonstrates that even in the case of DNN (2,32), an attenuation of approximately −25 dB becomes possible, and furthermore, the attenuation effect becomes greater with increasing p. Note that the impact of quantization is expected to be reduced further in combination with a low-pass filter (LPF).

Figure 24:
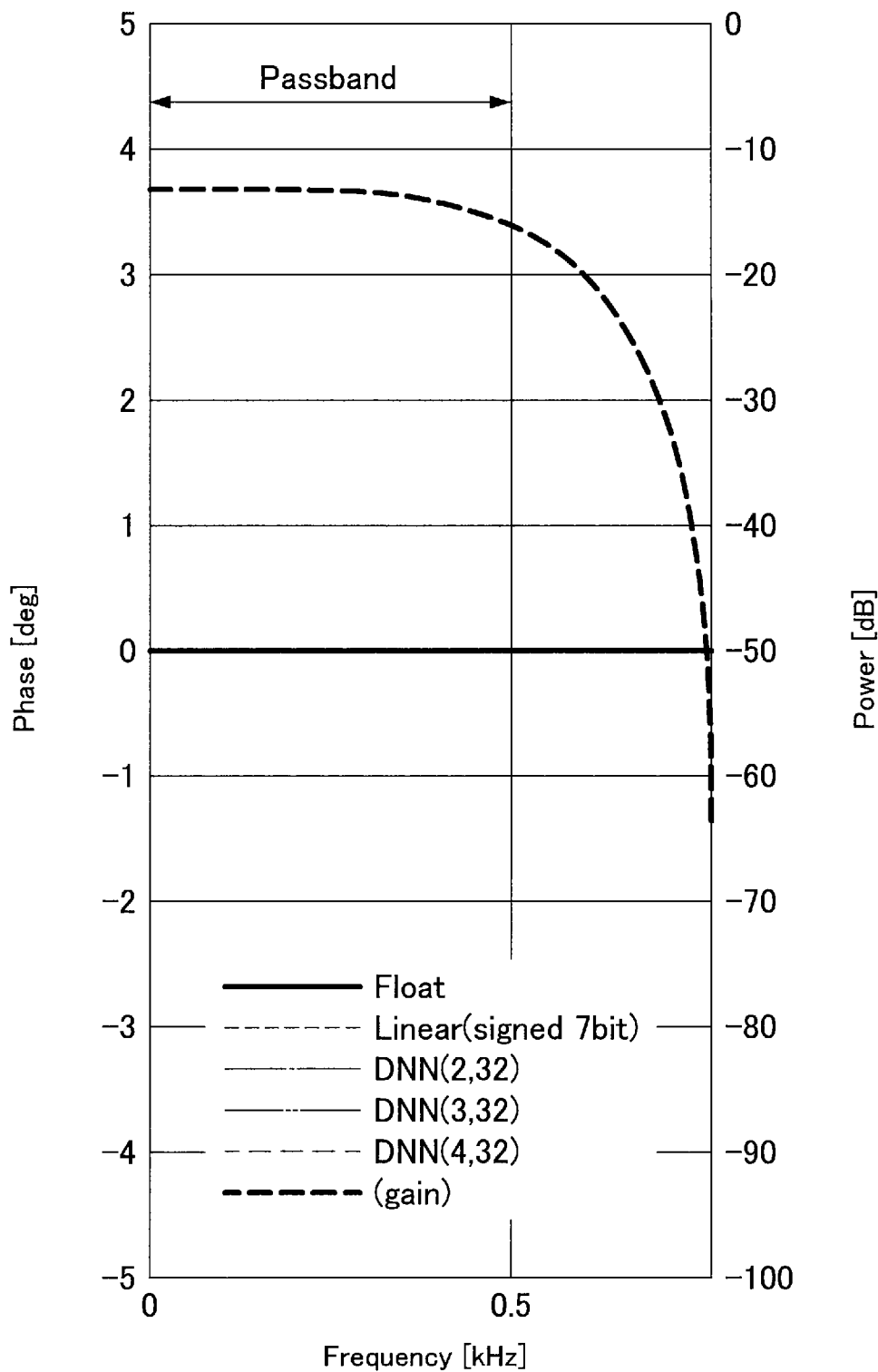
FIG. 24 is a diagram illustrating a simulation result according to phase characteristics when the quantization technique according to the same embodiment is applied to a bandpass filter.

Also, FIG. 24 is a diagram illustrating a simulation result according to phase characteristics when the quantization technique according to the present embodiment is applied to a bandpass filter. Referring to FIG. 24, it is demonstrated that even in the case of applying the quantization technique according to the present embodiment, phase rotation inside the passband, or in other words degradation of the phase characteristics, is not confirmed. In this way, the quantization technique according to the present embodiment does not greatly degrade the frequency characteristics of the handpass filter, and therefore is also adequately applicable to the field of communication technology.

Figure 25:
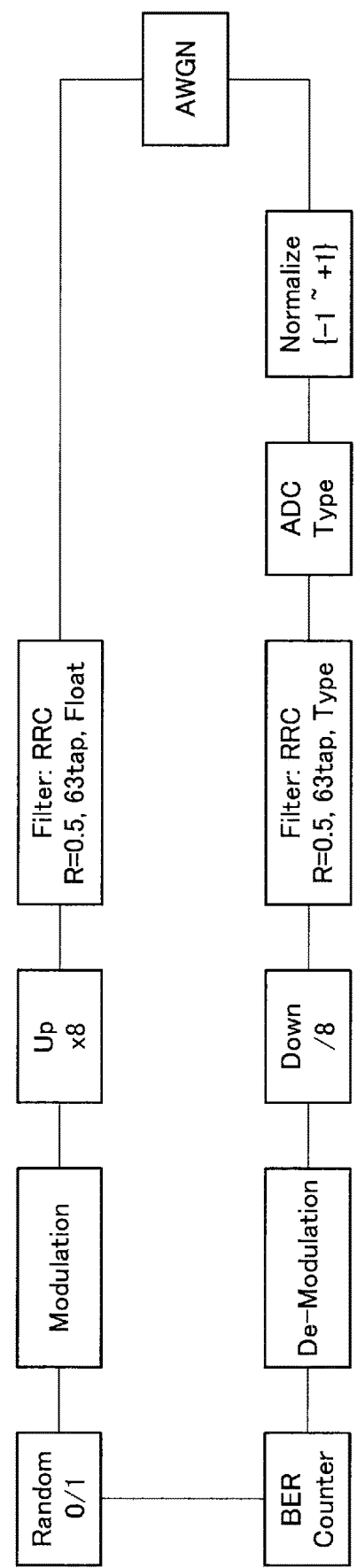
FIG. 25 is a block diagram utilized in BER evaluation according to the same embodiment.

In addition, to examine further the impact of the quantization technique according to the present embodiment, an evaluation according to the bit error rate (BER) was performed. FIG. 25 is a block diagram utilized in BER evaluation according to the present embodiment.

As illustrated in FIG. 25, in this evaluation, floating point, integer, and DNN(p,32) were applied in an analog-to-digital converter (ADC) and an RRC filter before demodulation, and the BER was measured. Also, for the modulation and demodulation scheme, each of BPSK, QPSK, and 16 QAM was used.

Figure 26:
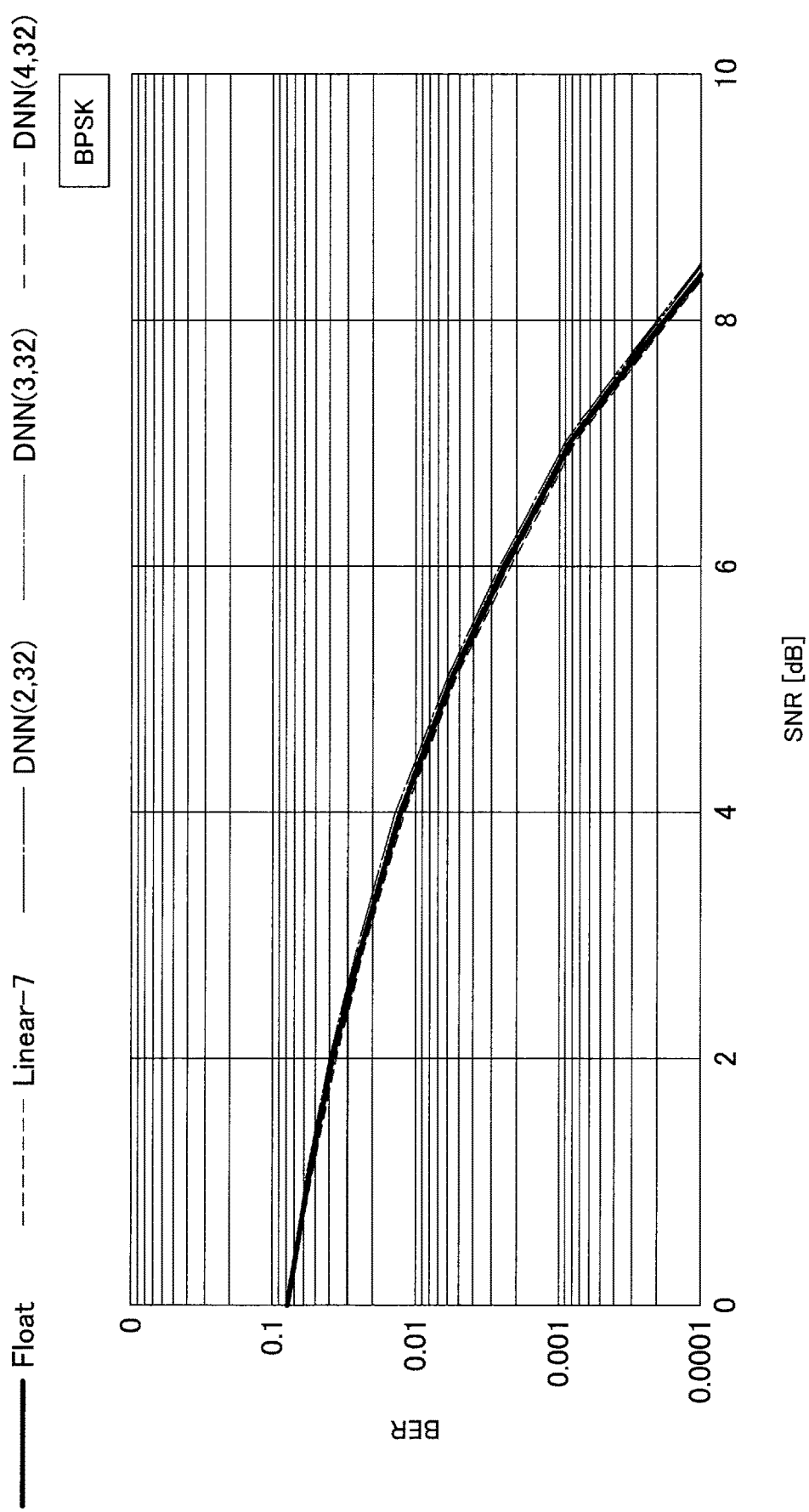
FIG. 26 is a diagram illustrating a BER evaluation result when using BPSK according to the same embodiment for the modulation method.
Figure 27:
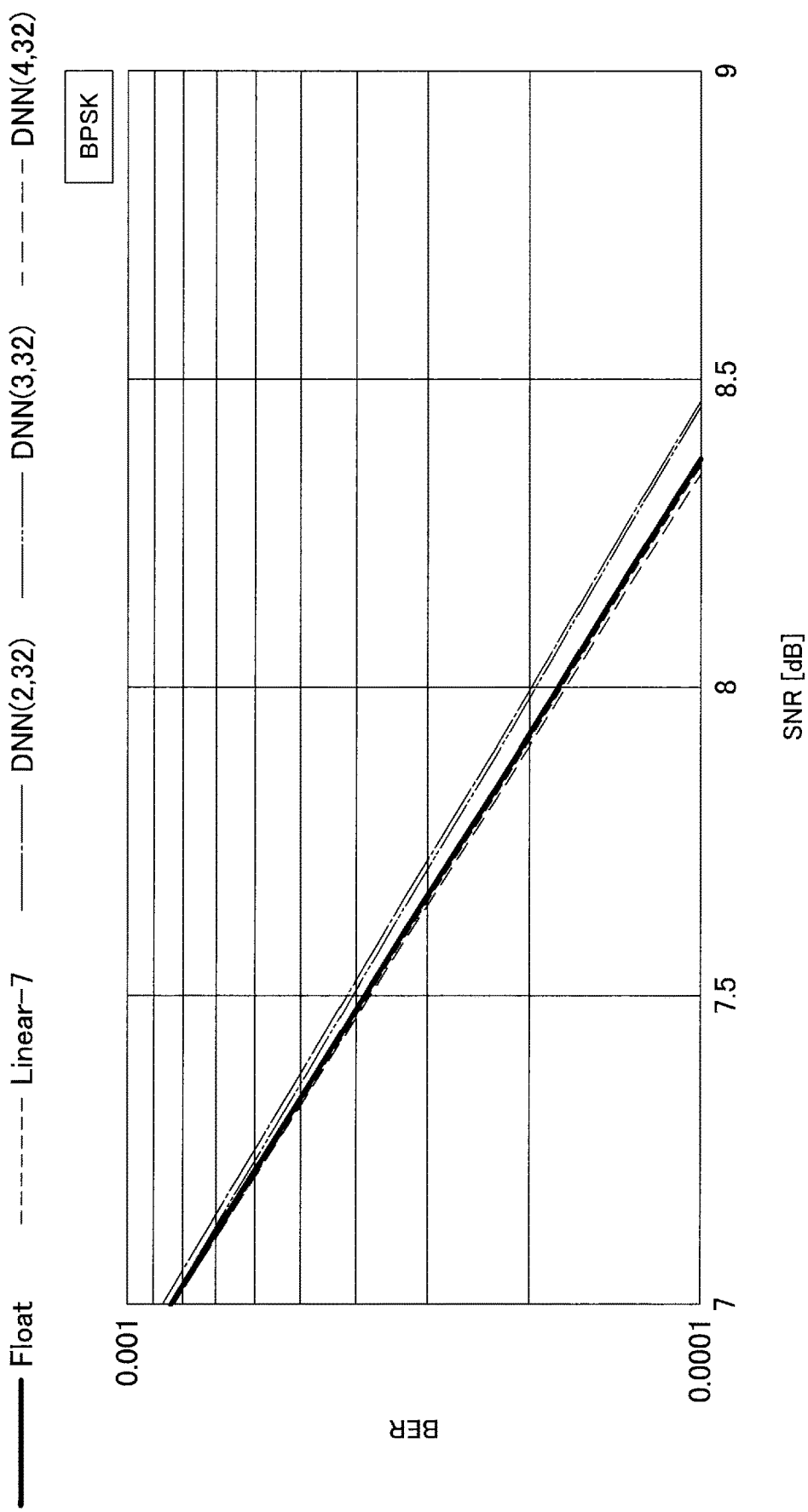
FIG. 27 is an enlarged view of the data of the SNR from 7 to 9 dB in FIG. 26.

FIG. 26 is a diagram illustrating the BER evaluation result when using BPSK as the modulation scheme. Also, FIG. 27 is an enlarged view of the data of the SNR from 7 to 9 dB in FIG. 26. Referring to FIGS. 26 and 27, it is demonstrated that in the case of using BPSK as the modulation scheme, for p=4 a degradation of the BER is not observed at all, and even for p=2 or p=3, the BER is not greatly affected.

Figure 28:
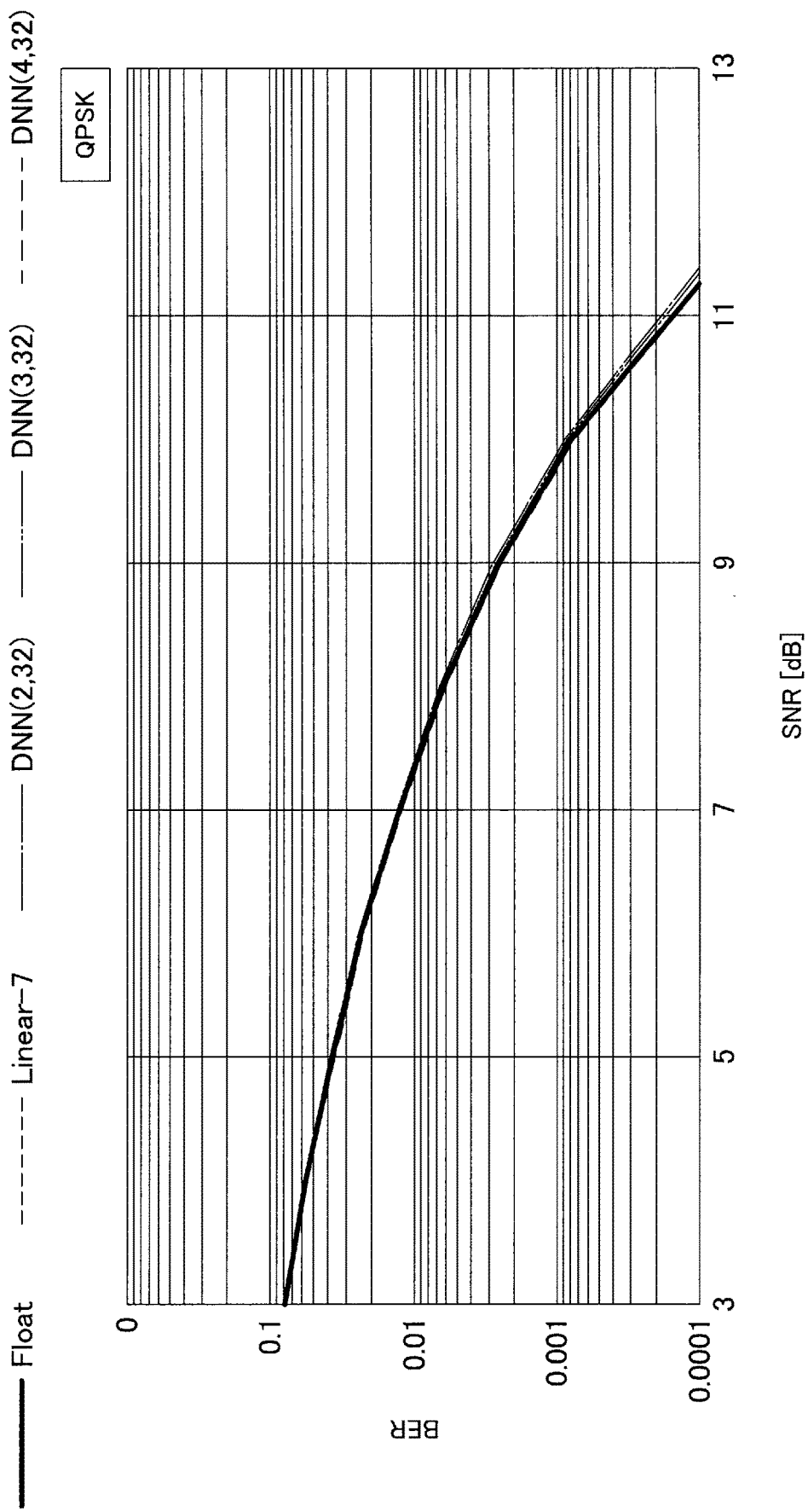
FIG. 28 is a diagram illustrating a BER evaluation result when using QPSK according to the same embodiment for the modulation method.
Figure 29:
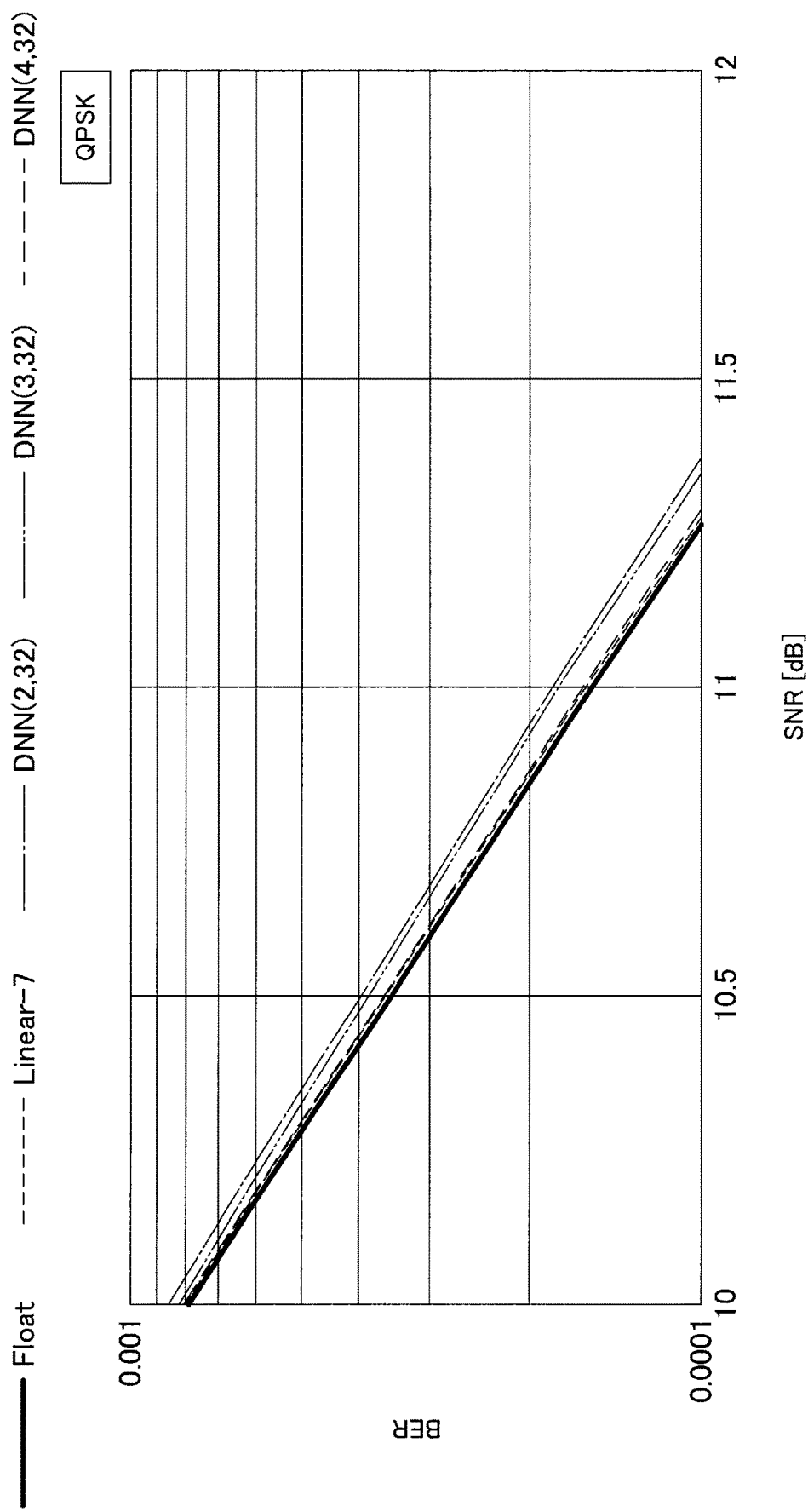
FIG. 29 is an enlarged view of the data of the SNR from 10 to 12 dB in FIG. 28.

FIG. 28 is a diagram illustrating the BER evaluation result when using QPSK as the modulation scheme. Also, FIG. 29 is an enlarged view of the data of the SNR from 10 to 12 dB in FIG. 28. Referring to FIGS. 28 and 29, it is demonstrated that in the case of using QPSK as the modulation scheme, similarly to the case of using BPSK, quantizing according to p=2 or 3 does not greatly affect the BER.

Figure 30:
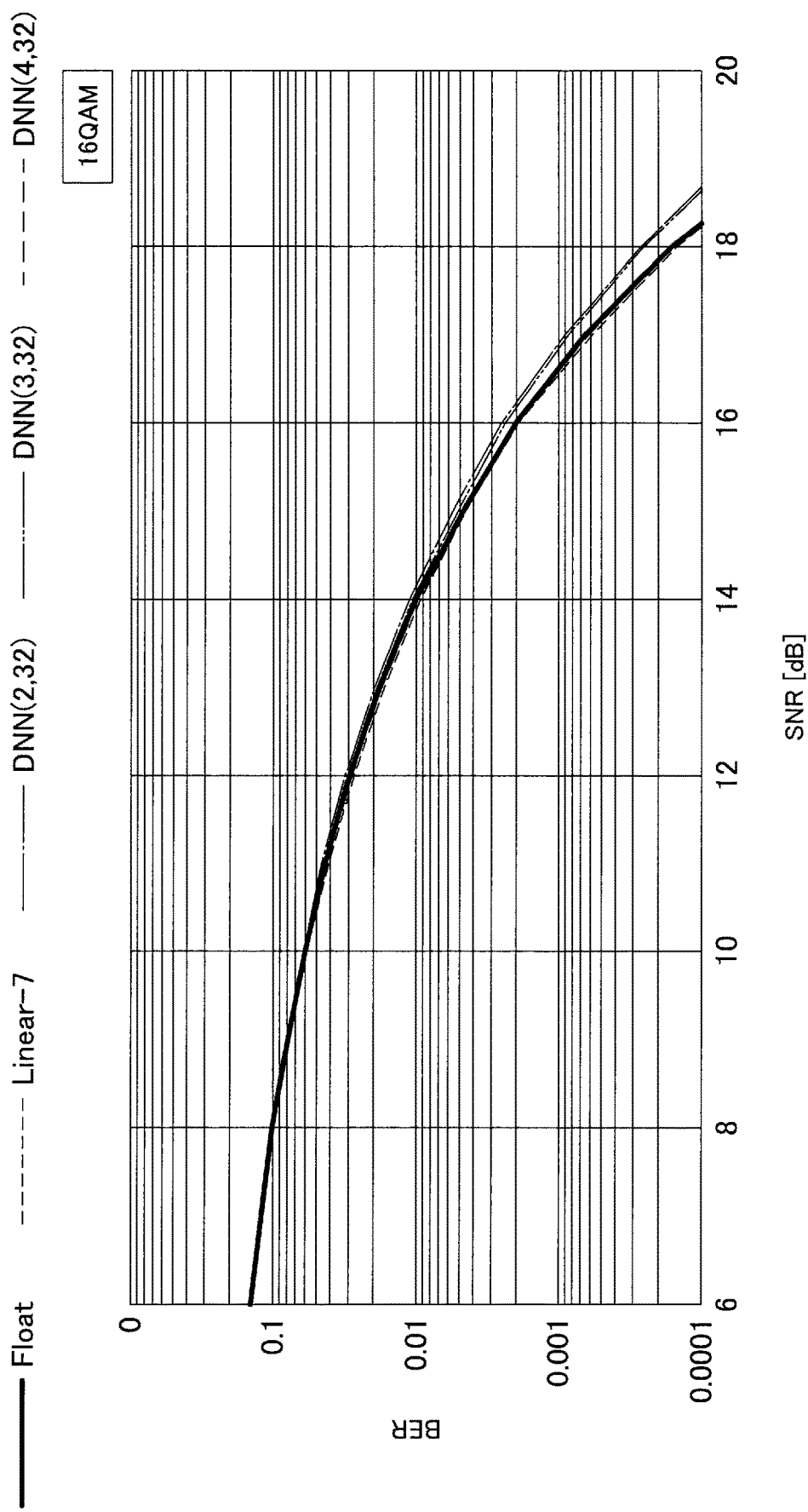
FIG. 30 is a diagram illustrating a BER evaluation result when using 16 QAM according to the same embodiment for the modulation method.
Figure 31:
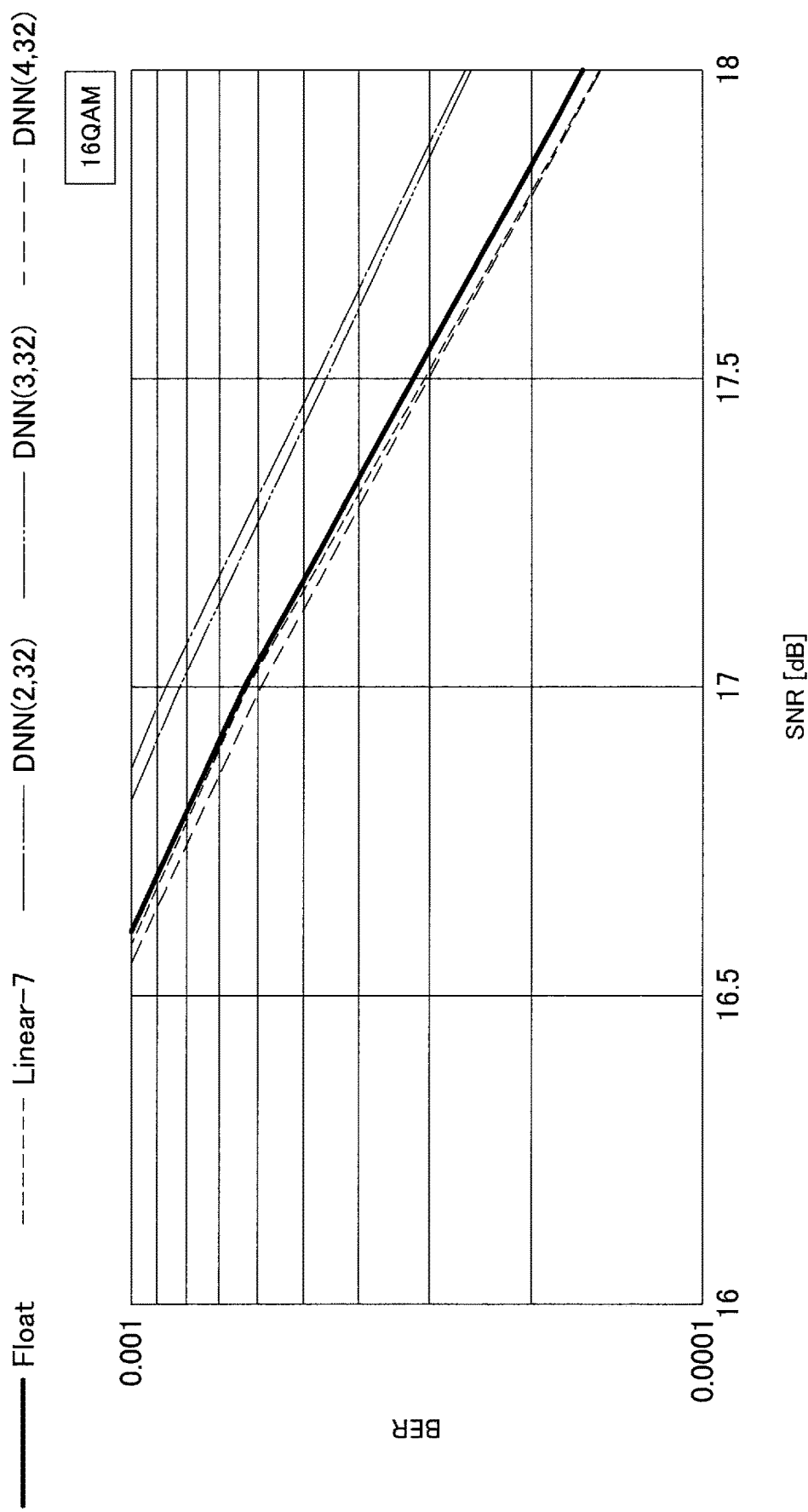
FIG. 31 is an enlarged view of the data of the SNR from 16 to 18 dB in FIG. 30.

FIG. 30 is a diagram illustrating the BER evaluation result when using 16 QAM as the modulation scheme. Also, FIG. 31 is an enlarged view of the data of the SNR from 16 to 18 dB in FIG. 30. Referring to FIGS. 30 and 31, it is demonstrated that in the case of using 16 QAM as the modulation scheme, although a rise in the BER is observed with quantization according to p=2 or 3, a degradation of the BER is not confirmed with quantization according to p=4.

As described above, in the case of using BPSK or QPSK for the modulation scheme, the quantization technique according to the present embodiment is considered effective regardless of the value of p. Also, in the case of using 16 QAM for the modulation scheme, if p≤4, the BER is not considered to be affected.

In this way, the quantization technique according to the present embodiment is also effective in the field of communication technology, and both a maintaining of performance and a reduction in processing load may be achieved.

3. HARDWARE CONFIGURATION EXAMPLE

Figure 32:
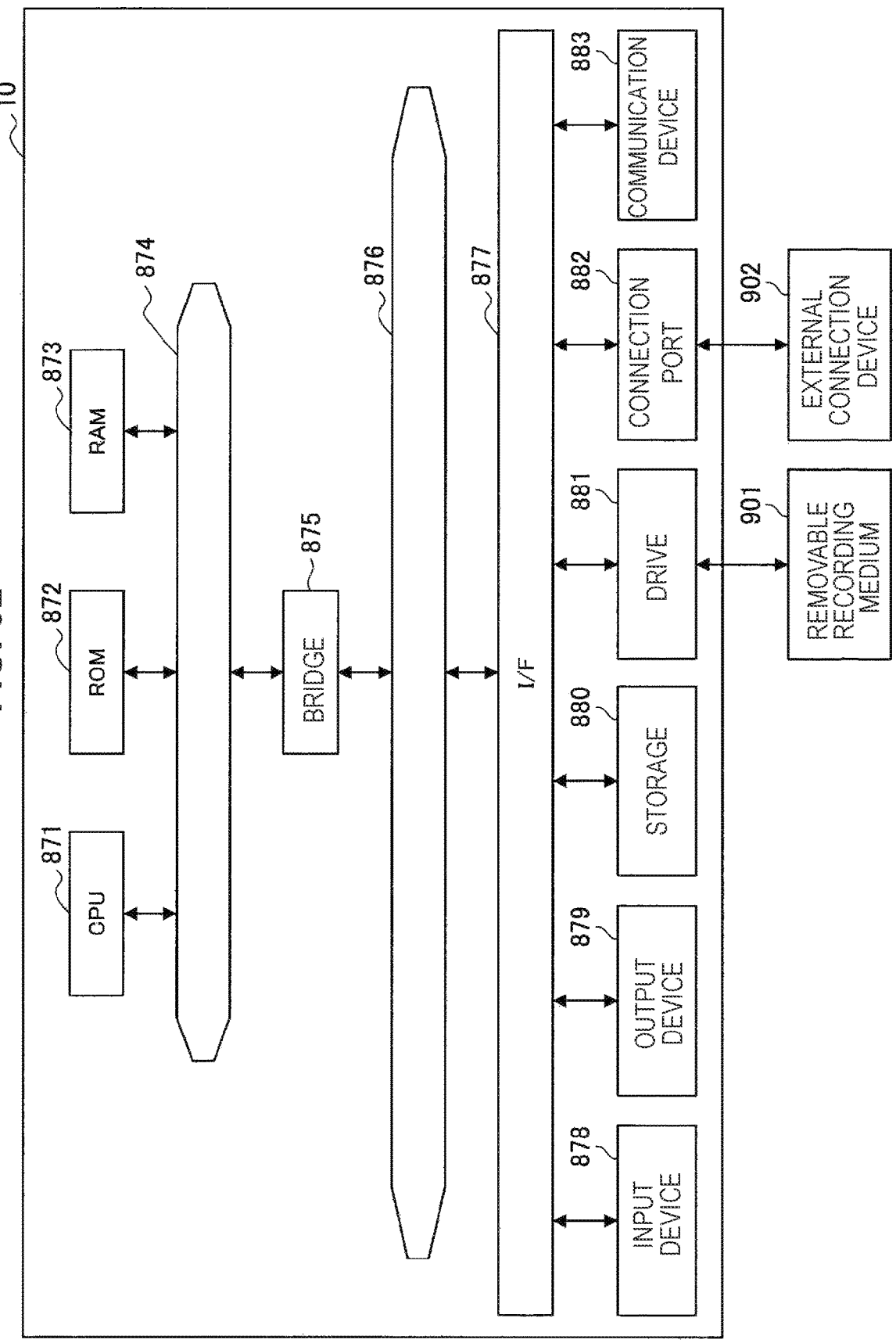
FIG. 32 is a diagram illustrating an exemplary hardware configuration according to one embodiment of the present disclosure.

An example of the hardware configuration common to the information processing device 10 according to an embodiment of the present disclosure is now described. FIG. 32 is a block diagram illustrating an example of the hardware configuration of the information processing device 10 according to an embodiment of the present disclosure. Referring to FIG. 32, the information processing device 10 includes, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.

(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves (hereinafter referred to as a remote controller). In addition, the input device 878 includes a speech input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure includes any of various types of vibration devices capable of outputting a tactile stimulus.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901 such as a magnetic disk, an optical disk, a magneto-optical disk, or semiconductor memory or writes information to the removable recording medium 901, (Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 is preferably, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), or wireless USB (WUSB), a router for optical communication, a router for asymmetric digital subscriber line (ADSL), or a modem for various communications.

4. CONCLUSION

As described above, the information processing device according to one embodiment of the present disclosure is provided with a multiply-accumulate operation circuit configured to execute a multiply-accumulate operation on the basis of multiple input values and multiple weight coefficients that are quantized by an exponential representation and that correspond to each of the Ogai input values. The exponents of the quantized weight coefficients are expressed by fractions taking a predetermined divisor p as the denominator. Also, the multiply-accumulate operation circuit performs the multiply-accumulate operation using different addition multipliers on the basis of the remainder determined from the divisor p. According to such a configuration, it becomes possible to further reduce the processing load associated with inner product operations while also guaranteeing the quantization granularity of the weight coefficients.

The preferred embodiment(s) of the present disclosure has/have been described above with reference to the accompanying drawings, whilst the present disclosure is not limited to the above examples. A person skilled in the art can find various alterations and modifications within the scope of the appended claims, and it should be understood that they will naturally come under the technical scope of the present disclosure.

Further, the effects described in this specification are merely illustrative or exemplified effects, and are not imitative. That is, with or in the place of the above effects, the technology according to the present disclosure can achieve other effects that are clear to those skilled in the art from the description of this specification.

Additionally, the present technology may also be configured as below.

(1)

An information processing device including:

a multiply-accumulate operation circuit configured to execute a multiply-accumulate operation on the basis of multiple input values and multiple weight coefficients that are quantized by an exponential representation and that correspond to each of the input values, in which exponents of the quantized weight coefficients are expressed by fractions taking a predetermined divisor as a denominator, and the multiply-accumulate operation circuit performs the multiply-accumulate operation using different addition multipliers on the basis of a remainder determined from the di visor.

(2)

The information processing device according to (1), in which the multiply-accumulate operation circuit is provided with multiple different accumulators configured to hold a computational result for each remainder determined from the divisor.

(3)

The information processing device according to (2), in which the remainder is computed by a modulo operation taking a numerator related to the exponents of the quantized weight coefficients as a dividend, and the multiply-accumulate operation circuit additionally is provided with a selector configured to connect the accumulator corresponding to the remainder to the circuit.

(4)

The information processing device according to (3), in which the multiply-accumulate operation circuit additionally is provided with a shift operation unit that performs a shift operation related to the input values on the basis of a value obtained by integerizing a quotient from dividing the numerator by the divisor.

(5)

The information processing device according to (1) or (2), in which the input values are quantized by an exponential representation, the quantized input values are expressed by fractions taking a predetermined divisor as a denominator, and the remainder is remainder from treating a value obtained by summing a numerator related to the exponents of the quantized weight coefficients and a numerator related to the exponents of the quantized input values as a dividend.

(6)

The information processing device according to (5), in which the multiply-accumulate operation circuit is provided with multiple adder-subtractors for each accumulator corresponding to the remainder.

(7)

The information processing device according to (6), in which the multiply-accumulate operation circuit additionally is provided with a selector configured to input, on the basis of the remainder, a signal instructing the adder-subtractor corresponding to the remainder to execute computation.

(8)

The information processing device according to (1), in which the multiply-accumulate operation circuit additionally is provided with multiple memory circuits configured to hold each of the addition multipliers corresponding to the remainder.

(9)

The information processing apparatus according to (8), in which the multiply-accumulate operation circuit additionally is provided with a selector configured to connect the memory circuit corresponding to the remainder, on the basis of the remainder.

(10)

The information processing device according to any of (5) to 7, in which the divisor includes a first divisor determined with respect to the input values and a second divisor determined with respect to the weight coefficients, and the first divisor and the second divisor have mutually different values.

(11)

The information processing device according to any of (1) to 10, in which the divisor is a natural number.

(12)

The information processing device according to any of (1) to 10, in which the divisor is expressed by exponentiation.

(13)

An information processing method including:

executing a multiply-accumulate operation on the basis of multiple input values and multiple weight coefficients that are quantized by an exponential representation and that correspond to each of the input values, in which exponents of the quantized weight coefficients are expressed by fractions taking a predetermined divisor as a denominator, and the executing of the multiply-accumulate operation performs the multiply-accumulate operation using different addition multipliers on the basis of a remainder determined from the divisor.

REFERENCE SIGNS LIST 10 information processing device
110 input unit
120 computation unit
130 storage unit
140 output unit
200, 300, 400, 500 multiply-accumulate operation circuit

What is claimed is:

1. An information processing device comprising:
  a multiply-accumulate operation circuit configured to execute a multiply-accumulate operation on a basis of multiple input values and multiple weight coefficients that are quantized by an exponential representation and that correspond to each of the input values, wherein
  exponents of the quantized weight coefficients are expressed by fractions taking a predetermined divisor as a denominator, and
  the multiply-accumulate operation circuit performs the multiply-accumulate operation using different addition multipliers on a basis of a remainder determined from the divisor.

2. The information processing device according to claim 1, wherein
  the multiply-accumulate operation circuit is provided with multiple different accumulators configured to hold a computational result for each remainder determined from the divisor.

3. The information processing device according to claim 2, wherein
  the remainder is computed by a modulo operation taking a numerator related to the exponents of the quantized weight coefficients as a dividend, and
  the multiply-accumulate operation circuit additionally is provided with a selector configured to connect the accumulator corresponding to the remainder to the circuit.

4. The information processing device according to claim 3, wherein
the multiply-accumulate operation circuit additionally is provided with a shift operation unit that performs a shift operation related to the input values on a basis of a value obtained by integerizing a quotient from dividing the numerator by the divisor.

5. The information processing device according to claim 1, wherein
the input values are quantized by an exponential representation,
the quantized input values are expressed by fractions taking a predetermined divisor as a denominator, and
the remainder is remainder from treating a value obtained by summing a numerator related to the exponents of the quantized weight coefficients and a numerator related to the exponents of the quantized input values as a dividend.

6. The information processing device according to claim 5, wherein
the multiply-accumulate operation circuit is provided with multiple adder-subtractors for each accumulator corresponding to the remainder.

7. The information processing device according to claim 6, wherein
the multiply-accumulate operation circuit additionally is provided with a selector configured to input, on a basis of the remainder, a signal instructing the adder-subtractor corresponding to the remainder to execute computation.

8. The information processing device according to claim 5, wherein
the divisor includes a first divisor determined with respect to the input values and a second divisor determined with respect to the weight coefficients, and the first divisor and the second divisor have mutually different values.

9. The information processing device according to claim 1, wherein
the multiply-accumulate operation circuit additionally is provided with multiple memory circuits configured to hold each of the addition multipliers corresponding to the remainder.

10. The information processing apparatus according to claim 9, wherein
the multiply-accumulate operation circuit additionally is provided with a selector configured to connect the memory circuit corresponding to the remainder, on a basis of the remainder.

11. The information processing device according to claim 1, wherein
the divisor is a natural number.

12. The information processing device according to claim 1, wherein
the divisor is expressed by exponentiation.

13. An information processing method, executed by a processor, comprising:
executing a multiply-accumulate operation on a basis of multiple input values and multiple weight coefficients that are quantized by an exponential representation and that correspond to each of the input values, wherein
exponents of the quantized weight coefficients are expressed by fractions taking a predetermined divisor as a denominator, and
the executing of the multiply-accumulate operation performs the multiply-accumulate operation using different addition multipliers on a basis of a remainder determined from the divisor.

* * * * *